(12) United States Patent
Kapoor et al.

(10) Patent No.: US 12,210,898 B1
(45) Date of Patent: Jan. 28, 2025

(54) SCALING MACHINE LEARNING USING DYNAMIC SHARDING

(71) Applicant: Workday, Inc., Pleasanton, CA (US)

(72) Inventors: Sameer Kapoor, Milpitas, CA (US); Sergei Winitzki, San Francisco, CA (US)

(73) Assignee: Workday, Inc., Pleasanton, CA (US)

(*) Notice: Subject to any disclaimer, the term of this patent is extended or adjusted under 35 U.S.C. 154(b) by 732 days.

(21) Appl. No.: 17/471,869

(22) Filed: Sep. 10, 2021

(51) Int. Cl.
*G06F 9/48* (2006.01)
*G06F 9/50* (2006.01)

(52) U.S. Cl.
CPC ............ *G06F 9/485* (2013.01); *G06F 9/5077* (2013.01)

(58) Field of Classification Search
CPC .......... G06N 7/01; G06N 20/00; G06F 9/485; G06F 9/5077
See application file for complete search history.

(56) References Cited

U.S. PATENT DOCUMENTS

| | | | |
|---|---|---|---|
| 2017/0118281 A1* | 4/2017 | Lehmann | H04L 67/5682 |
| 2018/0253484 A1* | 9/2018 | D'Halluin | G06F 16/21 |
| 2019/0096164 A1* | 3/2019 | Graham | A63F 13/352 |
| 2019/0392051 A1* | 12/2019 | Damyanov | G06F 16/278 |
| 2021/0334630 A1* | 10/2021 | Lambert | G06N 3/047 |
| 2022/0032181 A1* | 2/2022 | Somadder | A63F 13/323 |
| 2022/0188700 A1* | 6/2022 | Khavronin | G06Q 30/0201 |

* cited by examiner

*Primary Examiner* — Brian W Wathen
(74) *Attorney, Agent, or Firm* — Van Pelt, Yi & James LLP

(57) ABSTRACT

The present application discloses a method, system, and computer system for dynamically managing or distributing models across a plurality of shards. The method includes determining that a first model is to be added to a first shard of a plurality of shards, the first shard being determined based at least in part on a predetermined cost function, adding the first model to the first shard, and restarting the first shard. The first model is associated with a first tenant. The first shard comprises at least one second model that is associated with a second tenant.

18 Claims, 14 Drawing Sheets

SCALING MACHINE LEARNING USING DYNAMIC SHARDING

BACKGROUND OF THE INVENTION

A system for big data processing comprises a system for deployments of applications, configurations, one or more datasets, and model(s) used in connection with analyzing the data (e.g., collectively, a shard). The one or more datasets are accessed by users associated with an organization. For example, users may input queries to a client terminal, and the queries are performed by the system for data processing (e.g., using the model(s)). At scale, the number of accesses or queries performed against the one or more datasets is very large, the number of organizations for which one or more datasets is stored is very large, and the models used in connection with analyzing the data become resource intensive as the models become more sophisticated as additional features are introduced. This creates a problem for maintaining models in memory for analyzing the applicable one or more datasets.

BRIEF DESCRIPTION OF THE DRAWINGS

Various embodiments of the invention are disclosed in the following detailed description and the accompanying drawings.

DETAILED DESCRIPTION

Figure 1:
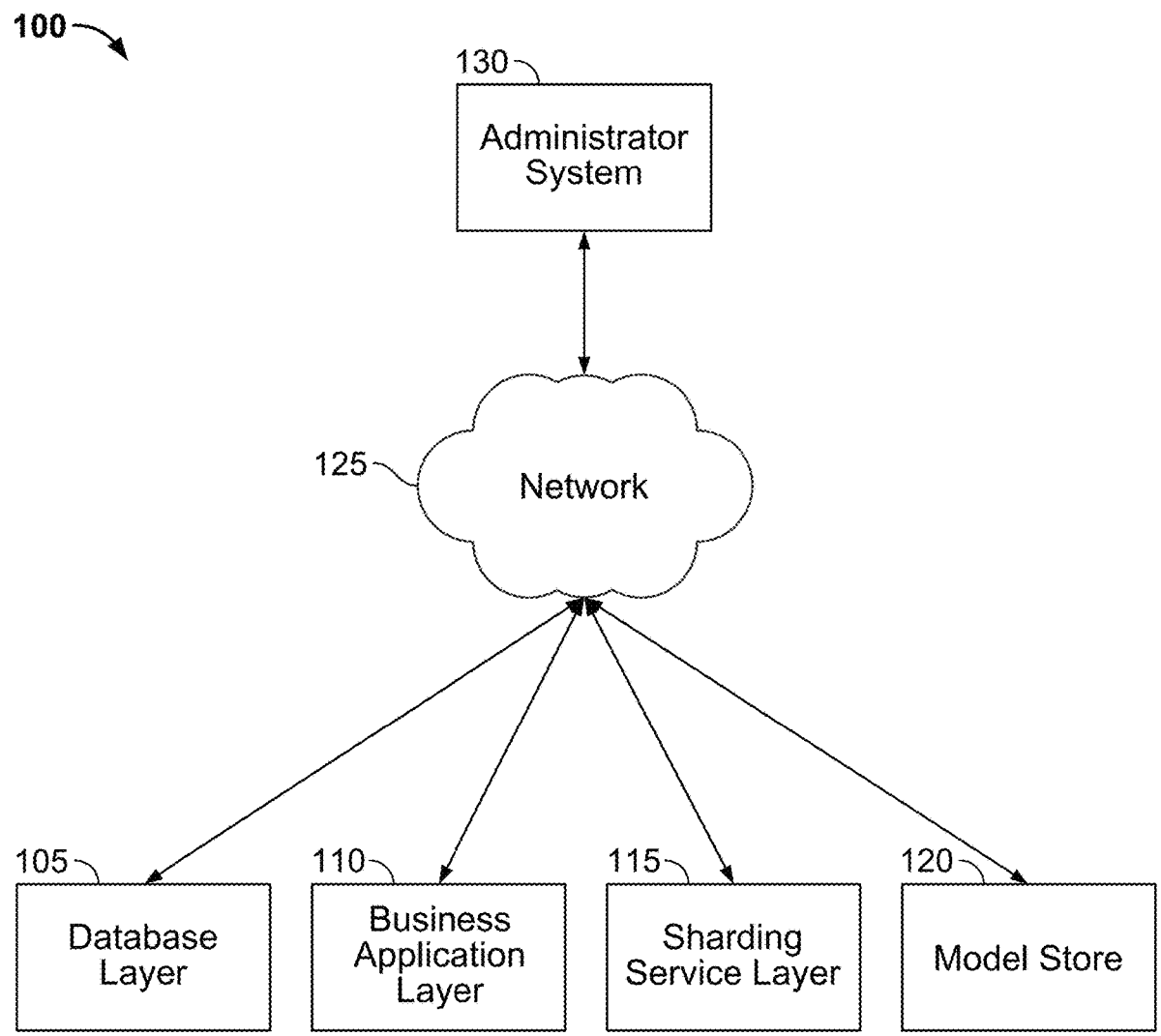
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for deploying models and/or managing shards is disclosed. The system comprises one or more processors and a memory. The one or more processors are configured to determine that a first model is to be added to the first shard of a plurality of shards, add the first model to the first shard, and restart the first shard. The first shard is determined based at least in part on a predetermined cost function. The first model is associated with a first tenant. The first shard comprises at least one second model that is associated with a second tenant. The memory coupled to the processor and configured to provide the one or more processors with instructions.

According to various embodiments, a system and/or method for managing deployment of new or updated models, and/or managing shards comprising one or more models is deployed. In various embodiments, an indication that a new or updated model is available (e.g., for deployment) may be received, and in response to receiving the indication that a new or updated model is available, a shard on which the new or updated model is to be deployed (also referred to herein as the selected shard for deployment) may be determined/selected (e.g., from existing shards or via a newly created shard). In response to selection of the selected shard for deployment, the new or updated model may be allocated (e.g., allocated based on a setting in a configuration mapping of models to shards, and/or copied/downloaded) to the selected shard on which the new or updated model is to be deployed. In some embodiments, after or in response to a determination that allocating of the model to the selected shard for deployment is complete (e.g., a copying/downloading of the model), the selected shard for deployment may be restarted. In some embodiments, the selected shard for deployment is determined based at least in part on one or more of (i) an amount of available memory on a shard on which a previous version of the model is deployed (e.g., in the case of the model being an updated model), and (ii) an amount of available memory on one or more other shards currently deployed. In some embodiments, the shard is determined based at least in part on a cost function (e.g., a predetermined cost function).

As used herein, a model may be a machine learning model that is used in connection with analyzing data in one or more datasets. The model may be used in connection with determining information responsive to a query with respect to one or more datasets. The model may be associated with a particular tenant. For example, a tenant may have its own one or more models.

As used herein, a shard may be a deployment of an application and a configuration across one or more virtual machines. The shard may comprise a resources overhead, including an application memory, an operating system memory, etc. The shard may be configured to comprise or deploy one or more models. In some embodiments, a shard in the set of shards has a non-overlapping set of models with other shards in the set of shards. The shard may be deployed using a container-orchestration system/service for automating computer application deployment, scaling, and management (e.g., a Kubernetes™ service). A shard may include a plurality of replica instantiations that contemporaneously serve traffic (e.g., the traffic to two instantiations of a shard may be served in parallel). In some embodiments, instantiations in a given shard are identical and each instantiation has an application that is able to load the models associated with the shard to process data. A shard is parameterized to have a number of instances (e.g., N instances, where N is a positive integer). In some implementations, N is on the order of 10-20. An instance may be instantiated on a virtual machine. In some embodiments, a shard includes a set of files that contains all the data for the models associated with the shard. For example, the set of files includes a domain name system (DNS) entry data, a routing data, and/or initialization and configuration data for the models. Incoming traffic to a shard may be routed among the instances in the shard according to one or more predefined rules. In some implementations, the incoming traffic to a shard is routed among the instance in the shard according to a round-robin deployment (e.g., a first query is routed to a first instance, a second query is routed to a second instance, a third query is routed to a third instance, etc.).

As used herein, a tenant may be an organization associated with a database, such as a client of a software as a service provider. The tenant may be a company, a department unit, etc.

According to various embodiments, a shard comprises a plurality of models for a plurality of tenants. For example, a shard comprises one or more datasets respectively for at least two tenants, and the shard comprises a plurality of models for each of the tenants. In some embodiments, a system comprises a plurality of shards, and at least two of the plurality of shards have (i) one or more datasets respectively for at least two tenants, and (ii) a plurality of models for each of the tenants. The system may manage and/or route traffic among the plurality of shards based at least in part on the tenants and/or models deployed on a shard. The system may move a model from one shard to another shard in a manner that optimizes or reduces downtime. In some embodiments, the system may move deployment of a model across shards without any downtime (e.g., downtime arising from the move). For example, the system may direct traffic to a shard containing a model, and re-route such traffic/future traffic to another shard on which the corresponding model is deployed in response to a determination that deployment of the model on the other shard is complete.

In some embodiments, a shard comprises a "copy" of the application. Shards each receive a subset of tenant requests and hold a subset of tenanted models. The original deployment (e.g., deployment of the application) is kept around as a "default" shard, in case a request comes in for a tenant that is not registered. Accordingly, the creation/deployment of a plurality of shards may comprise deployment of the corresponding application in multiple copies.

According to various embodiments, the system comprises a sharding service that manages shards and/or deployment of models on the shards. The sharding service may determine that a model is to be deployed (e.g., that a model is updated, or that a new model has been created), and in response to determining that the model is to be deployed, determine a shard on which to deploy the model (e.g., the selected shard for deployment).

In some embodiments, determining the shard on which to deploy the model includes determining to create a new shard. If an existing shard does not have sufficient capacity (e.g., sufficient available memory) for the model to be deployed, the sharding service may determine to create a new shard and may deploy the model on the new shard.

In some embodiments, in the case that the model to be deployed is an updated model of a model currently deployed, the sharding service may determine whether to deploy the updated model on the shard on which the existing model (e.g., the version prior to the update) is currently deployed (also referred to herein as the current shard) based on whether the current shard has sufficient memory to store and deploy the updated model. Sufficient memory may correspond to a size of the updated model. In some embodiments, sufficient memory may be determined to correspond to the size of the updated model and predefined threshold amount of remaining space after the updated model is deployed. The predefined threshold may be set to be a percentage of the available free memory of a shard. For example, sufficient memory may be determined to be equal to 75% of the initial available free memory of the shard. Various other percentages of the initial available free memory of the shard may be implemented in connection with the predefined threshold. In some embodiments, the predefined threshold is configurable. In some embodiments, the initial available free memory of the shard corresponds to the available memory after the overhead (e.g., the memory used to store an application and the memory used to store an operating system). In some embodiments, when an application is deployed/updated, the amount of free available memory is calculated. The calculation is stored and the system allows a certain percentage of the free available memory to be utilized. In some embodiments, a minimum buffer is configurable and can be set to a percentage of the initial calculated available free memory of an empty shard.

In some embodiments, determining that a shard on which to deploy the model comprises determining an amount of available memory on a set of existing shards. For example, the sharding service may determine the amount of available memory for each of the existing shards. As another example, the sharding service may determine the amount of available memory for each of the existing shards corresponding to the tenant for which the model is to be deployed. In some embodiments, the system (e.g., the sharding service) sorts the existing shards according to an amount of available memory, and the shard on which the model is to be deployed is selected as the existing shard having the greatest amount of available memory. In some embodiments, the system (e.g., the sharding service) sorts the existing shards in descending order according to an amount of available memory, and the system (e.g., the sharding service) iterates through the sorted list of existing shards and determines the first existing shard that has sufficient available memory to store/deploy the model.

In some embodiments, determining that a shard on which to deploy the model comprises determining, for one or more existing shards, a corresponding value associated with a cost function. The cost function may be computed based on one or more variables associated with the corresponding shard and/or model to be deployed. In some implementations the cost function may comprise respective weightings for the one or more variables. Examples of the one or more variables include an amount of traffic to the shard (e.g., an average amount of traffic, an amount of traffic over a predetermined amount of time, etc.), an available memory of the shard, a size of the tenant associated with the model to be deployed, a bandwidth for the shard, a number of queries sent to the shard (e.g., an average number of queries, a number of queries over a predefined period of time, etc.), processor usage (e.g., a central processing unit (CPU) of a server, blade, etc.), a predicted performance (e.g., based on a performance model, a simulation, and/or testing of the model on the shard or replica of the shard using real traffic), a number of users associated with a tenant for which a model is on the shard, an average number of transactions associated with a tenant over a corresponding predefined period of time, etc. Various other variables may be implemented. An example of a cost function may be based at least in part on an average amount of traffic to the applicable shard and an amount of available memory of the applicable shard. Another example of a cost function may be based at least in part on a size of a tenant associated with the model to be deployed and an amount of available memory of the applicable shard.

In some embodiments, determining that a shard on which to deploy the model comprises determining the production system on which the model is to be deployed (e.g., the system associated with the tenant corresponding to the model), instantiating and deploying a parallel instance of application, deploying the model on the parallel instance, routing (e.g., diverting) traffic for the production system to the parallel instance on which the model is deployed, and obtaining feedback information from applying (e.g., running) the model using the routed traffic. In some embodiments, rather than routing traffic for the production system, simulated traffic is provided to the parallel instance, and the feedback information from applying (e.g., running) the model using the simulated traffic is obtained. One or more metrics may be determined based on the feedback information. For example, the one or more metrics may measure a performance of the model on the parallel instance. The system may deploy/simulate deployment of the model on different parallel instances/shards in connection with determining an expected performance of deployment of the model on the different parallel instances/shards (and selecting the shard on which to deploy the model).

According to various embodiments, models within a same instance and a same shard share may share application memory and operating system memory. As an example, a first model in a first shard shares overhead resources (e.g., resources corresponding to application memory and operating system memory) with a second model in the first shard. For example, the shard may be deployed using a container-orchestration system/service for automating computer application deployment, scaling, and management (e.g., Kubernetes). In connection with deploying the shard, a group of instances (e.g., replica pods) may be deployed in a cluster. The instances may comprise overhead corresponding to application memory (e.g., memory storing the containerized application) and operating system memory. A shard may comprise a plurality of instances, and each of the plurality instances may be identical with respect to one or more applications running on each of the plurality of instances and configurations of each of the plurality of instances.

According to various embodiments, in response to determining that a model is to be deployed to a shard, the model is allocated (e.g., set in a configuration mapping of models to shards, and/or copied/downloaded to the shard, etc.). The system may determine when the allocation of the model to the shard is complete. In response to determining that the allocating of the model is complete, the shard may be restarted. For example, in response to determining that adding the first model to the first shard is complete, deleting the first model from a second shard on which the first model was running. In some embodiments, each time a model is added to a shard (or a model is updated on the shard), the shard is restarted (e.g., before use of the model). For example, because an application running on an instance/shard is only aware of information it has read when the application was booted/loaded, a new model copied to the shard after loading of the application will not be usable by the application. In some embodiments, in response to restarting the shard, traffic for the tenant (e.g., for the model) is routed to the shard on which the model is deployed. If the model deployed on the shard is an updated model (e.g., an updated version of an existing model), the system (e.g., the sharding service) may delete the non-updated model (e.g., the previous model) from the shard on which the non-updated model was deployed. Deletion of the non-updated model may free memory on the shard, which may serve as available memory for deployment of a subsequent model (e.g., a new or updated model). The shard may be restarted after deletion of the non-updated model. In some implementations, rather than deleting the non-updated model from free memory, the system deems the memory occupied by the non-updated model as allocable memory or available memory on which a subsequent model may be deployed.

According to various embodiments, if an application is updated, then all shards on which the application is deployed/running are updated and restarted. For example, the shards on which the application is deployed is updated and restarted in order for the shard to benefit from the update to the application. The shards on which the application is deployed/running may be updated and restarted on a rolling basis such as to avoid all replica pods of the shards (e.g., instantiations of the shards) from being down/inoperable at the same time. For example, a predefined number of shards may be contemporaneously or simultaneously updated/restarted, and the predefined number may be less than all the replica pods of the shards on which the application is deployed. In some embodiments, the system updates/restarts the shards in a manner that at least one replica pod of the shard associated with a particular tenant is still operating (e.g., servicing traffic to the shard) at any given time, so as to avoid a service for a tenant from being down. The replica pods of shard on which the application is deployed/running may be updated and restarted on a batch update basis.

A shard may be deleted in connection with a deletion of an application. In some embodiments, in response to deletion of an application, the system deletes all shards on which the deleted application is loaded. In some embodiments, a shard is only associated with one application. If the application is deleted and the shard is empty, the shard may unnecessarily consume system resources. For example, if models are dynamically allocated to shards according to a determination of a first shard with sufficient memory (e.g., a shard having the minimum amount of available memory sufficient for the model among existing shards), the empty shard may remain empty and unused for a relatively long time.

The deployment of models in connection with a service for analyzing one or more datasets associate with a tenant generally includes storing portions of the models associated with a tenant in memory. The storing of the models is resource/memory intensive. Related art systems may create a plurality of instances that service a tenant, with each instance storing a different model. However, the creation of the plurality of instances to serve the client may duplicate a lot of overhead that is comprised in each instance. For example, each instance or shard comprises overhead corresponding to application memory and operating system memory. Accordingly, the foregoing related art may be sufficient for executing a model on a dataset for a tenant, however, such a system does not scale to a large number of models, tenants, and/or transactions (e.g., queries).

A bin packing method for allocating and packing models across shards is a method that strives to optimize the use of memory for storing models. Accordingly, as models are updated or created, the bin packing method analyzes the allocation of all models across the various shards and determines the most efficient manner of allocating and packing models in the shards in effort to optimize the packing density across the shards (e.g., to limit the number of shards necessary). In some embodiments, a bin packing method may result in a model being reallocated to a different shard, sometimes numerous times. However, models are generally memory intensive, and the cost of moving a model from one shard to another shard is expensive. Further, moving a model from one shard to another shard may increase the probability that an error occurs (e.g., an error in transferring the model, running the model, routing traffic to the model, etc.). Whenever a model is moved to another shard (e.g., whenever a model is newly copied to a shard), the shard must be restarted in order for the application deployed on the shard to be able to use the model.

In contrast to the related art systems, various embodiments dynamically allocate models across one or more shards. As discussed above, creation of a plurality of instances that services a tenant duplicates a lot of overhead resources in each shard (e.g., the application memory and operating system memory). In addition, models are resource/memory intensive and moving models to different shards is expensive. Accordingly, various embodiments allocate models across shards in a manner that reduces or limits the duplication of overhead resources, and in a manner that reduces or limits the number of times the model is moved/copied to different shards.

According to various embodiments, in the case of an updated model, the system (i) first selects to maintain an updated model on a current shard if the current shard has sufficient available memory, and if the current shard does not have sufficient available memory, (ii) secondly selects from among existing shards the shard having the least available memory conditioned on shard having sufficient available memory for the updated model, and (iii) thirdly creates a new shard if no existing shard has sufficient available memory. In some embodiments, the shard selected is the shard having the most available memory.

The system improves the storage of models by enabling more efficient allocation of models across shards to optimize or limit the resources consumed in moving models (e.g., to limit a number of times a model is moved across shards) and in limiting the overhead incurred in association with maintaining several shards, each of which may have several instances. The system further improves the handling of data to and from models by managing traffic to different shards and routing traffic as appropriate when models are not able to immediately process data (e.g., by directing data traffic from an input to a model, by redirecting or transmitting from storage data traffic to a transferred or updated model once the transfer or update is complete, etc.). As an example, in the case of an update to a model already allocated to a shard, the application loading the updated model seamlessly transitions from the older to the newer model. As another example, in the case that an updated model is allocated to a shard that is from the shard on which an existing/deployed model is allocated, the system continues to route traffic for the service to the shard on which the existing/deployed model is allocated until the updated model has been successfully loaded to the selected shard for deployment, and in response to a determination that the updated model is successfully loaded to the selected shard for deployment (e.g., the selected shard for deployment is ready to service traffic), the system reroutes traffic to the selected shard for deployment.

FIG. 1 is a block a diagram of a network system according to various embodiments of the present application.

In the example illustrated in FIG. 1, system 100 includes server database layer 105, business application layer 110, sharding service layer 115, model store 120, user system 135, and an administrator system 130. In some embodiments, one or more of business application layer 110, sharding service layer 115, model store 120 may be integrated (e.g., combined into a layer or single set of server(s)). For example, the sharding service layer 115 may include model store 120, database layer 105, business application layer 110, and/or administrator system 130. System 100 further includes one or more networks such as network 125 over which administrator system 130 communicates with one or more of database layer 105, business application layer 110, sharding service layer 115, user system 135, and/or model store 120. In various embodiments, network 125 includes one or more of a wired network, and/or a wireless network such as a cellular network, a wireless local area network (WLAN), or any other appropriate network. In some embodiments, database layer 105, business application layer 110, sharding service layer 115, model store 120 are respectively implemented by one or more servers. System 100 may include various other systems or terminals.

Administrator system 130 comprises an administrator system for use by an administrator. For example, administrator system 130 comprises a system for communication, data access, computation, etc. An administrator uses administrator system 130 to maintain database layer 105. For example, an administrator uses administrator system 130 to start and/or stop services on database layer 105, to reboot database layer 105, to install software on database layer 105, to add, modify, and/or remove data on database layer 105, etc. Administrator system 130 communicates with database layer 105 via a web-interface. For example, administrator system 130 communicates with database layer 105 via a web-browser installed on administrator system 130. As an example, administrator system 130 communicates with database layer 105 via an application running on administrator system 130. As another example, administrator system 130 communicates with administrator system 130 and communicates with database layer 105, business application layer 110, sharding service layer 115, user system 135, and/or model store 120 via an application running on administrator system 130. An administrator user uses administrator system 130 to configure and/or access data stored in database layer 105, such as to query or configure a dataset for an associated tenant.

In various embodiments, an administrator (or other user associated with a tenant) uses administrator system 130 to configure a service provided to a tenant. As an example, the administrator uses administrator system 130 to communicate with business application layer 110 to configure the service provided to the tenant. In some embodiments, business application layer 110 serves as a gateway via which the administrator may interface to manage, configure, etc. database layer 105, sharding service layer 115, and/or model store 120.

The database layer 105 stores one or more datasets. In various embodiments, the one or more datasets comprise human resources data, financial data, organizational planning data, or any other appropriate data. In some embodiments, the database layer 105 stores one or more datasets for a plurality of tenants. For example, the database layer 105 hosts at least part of a software as a service (e.g., a database storing data for the service) for a plurality of tenants such as customers for a provider of the software as a service). In various embodiments, a tenant comprises an organization such as a company, a government entity, a sub-organization of an organization (e.g., a department), or any other appropriate organization. For example, database layer 105 comprises a database system for storing data in a table-based data structure, an object-based data structure, etc. In various embodiments, database layer 105 comprises a business database system, a human resources database system, a financial database system, a university database system, a medical database system, a manufacturing database system, or any other appropriate system. In some embodiments, database layer 105 comprises an object-oriented database system.

According to various embodiments, a user uses user system 135 to execute one or more tasks with respect to data (e.g., one or more datasets) stored on database layer 105. For example, a user inputs to user system 135 a query or request to execute a task (e.g., run a query against a dataset) at database layer 105, and database layer 105 receives the query or request to execute the task from user system 135 via network 125, etc. In response to receiving the query or request to execute the task, database layer 105 executes the task and provides a result to the user via user system 135. In some embodiments, the result comprises information or a set of information that is responsive to the query or execution of the task. In some embodiments, the result comprises a report including information that is responsive to the query or execution of the task or selectable elements (e.g., links such as hyperlinks) that point to information that is responsive to the query or execution of the task.

According to various embodiments, sharding service layer 115 provides dynamic allocation of models across shards. In some embodiments, sharding service layer 115 manages shards (e.g., shards associated with a tenant or a plurality of tenants). For example, sharding service layer 115 determines to create a shard, creates the shard (or requests creation of a shard such as by sending an instruction to another service), and manages deployment of one or more applications and/or one or more models on one or more shard. As another example, sharding service layer 115 determines allocation of models across shards (e.g., as models are created or updated). As another example, sharding service layer 115 manages updating of an application, including deployment of application updates across shards on which the corresponding application is installed/running. According to various embodiments, sharding service layer 115 stores and/or manages configurations of one or more shards, a mapping of applications to shards, a mapping of models to applications, a mapping of models to tenants, and/or a mapping of models to shards. In some embodiments, sharding service layer 115 stores configuration and/or information pertaining to models. For example, sharding service layer 115 stores information pertaining to versions of models, sizes of models, etc.

According to various embodiments, model store 120 comprises one or more datasets that store one or more models. As an example, model store 120 stores updated models (e.g., current versions of models). An administrator uses administrator system 130 to update a model or upload an updated model to the model store 120. In some embodiments, model store 120 stores a plurality of versions of a particular model (e.g., a current version of the model, a previous version of the model, etc.). For example, model store 120 determines versions of a model currently deployed across existing shards (e.g., an updated model may be running on a subset of shards, and a previous version of the model may be running on another subset of shards such as because the shard(s) storing the previous version has not yet been updated, etc.), and stores those versions of the model.

According to various embodiments, business application layer 110 provides an interface via which a user (e.g., using user system 135) may interact with database layer 105, sharding service layer 115, and/or model store 120. For example, a user queries database layer 105 by sending a query/request to business application layer 110, which interfaces with database layer 105 to obtain information responsive to the query (e.g., business application layer 110 formats the query according to the applicable syntax and send the formatted query to database layer 105). As another example, an administrator uses an interface provided/configured by business application layer 110 to upload an updated model or a new model to model store 120, or to revise a model currently stored in model store 120. As another example, an administrator uses sharding service layer 115 to configure policies for dynamically allocating shards (e.g., setting/updating a cost function used in connection with selecting a shard on which a model is to be copied, setting a configuration for performing batch updates of models or applications on shards, etc.).

In some embodiments, database layer 105, business application layer 110, sharding service layer 115, and/or model store 120 are implemented on a single server or a plurality of servers. For example, database layer 105 and business application layer 110 are different modules running on a same server or set of servers.

Figure 2:
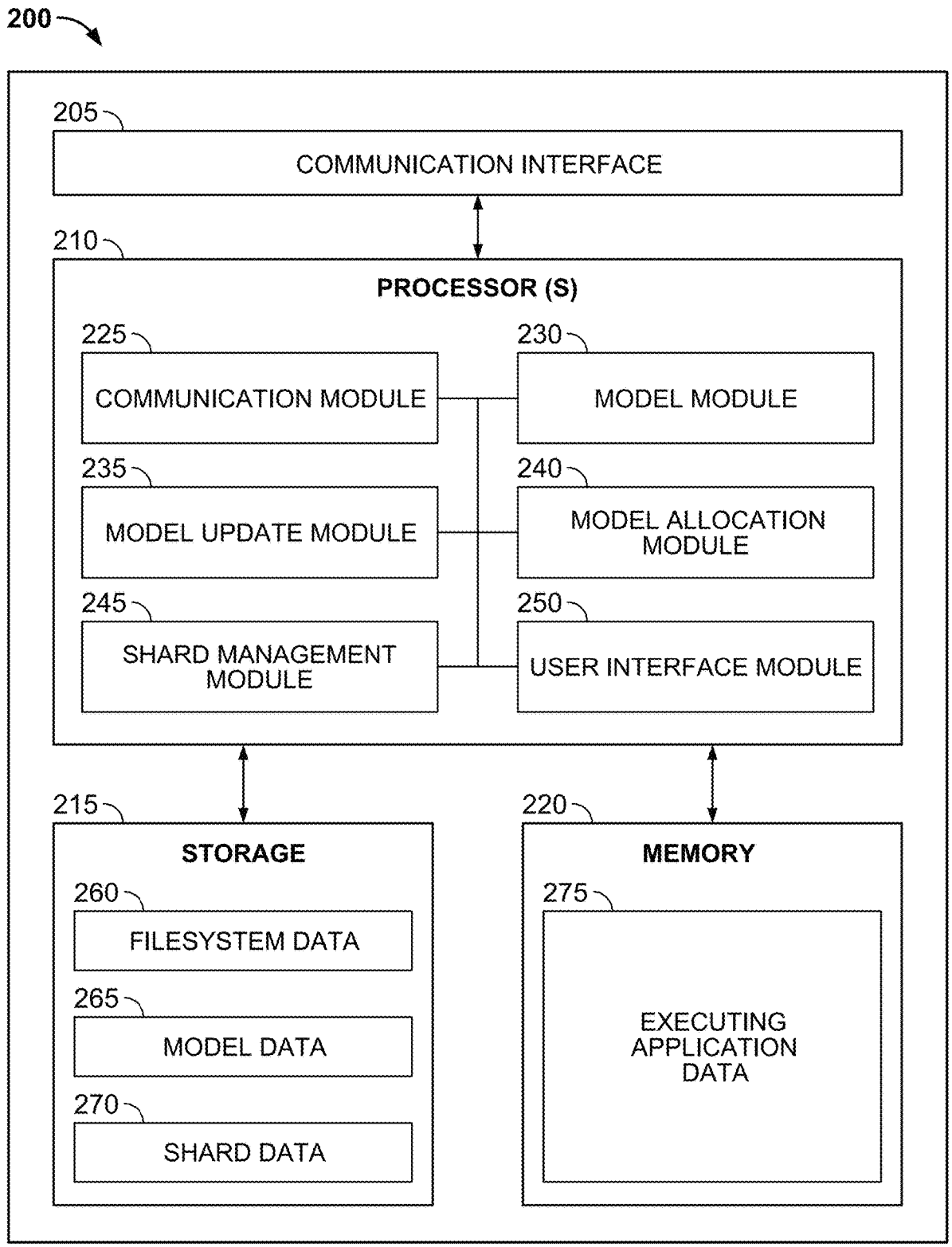
FIG. 2 is a block diagram of a sharding service system according to various embodiments of the present application.

FIG. 2 is a block of a sharding service system according to various embodiments of the present application. In some embodiments, system 200 comprises or corresponds to sharding service layer 115. In some embodiments, system 200 further comprises one or more of business application layer 110, database layer 105, and/or model store 120. System 200 may implement at least part of system 300 of FIG. 3A, process 400 of FIG. 4, process 500 of FIG. 5, process 600 of FIG. 6, process 700 of FIG. 7, process 800 of FIG. 8, process 900 of FIG. 9A, and/or process 950 of FIG. 9B, and/or process 1000 of FIG. 10.

In the example shown, system 200 implements one or more modules in connection with dynamically allocating models that are used in connection with analyzing (e.g., querying) one or more datasets. System 200 comprises communication interface 205, one or more processors 210, storage 215, and/or memory 220. One or more processors 210 comprises one or more of communication module 225, model module 230, model update module 235, model allocation module 240, shard management module 245, and/or user interface module 250.

In some embodiments, system 200 comprises communication module 225. System 200 uses communication module 225 to communicate with various client terminals or user systems such as a user system or an administrator system. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems. The one or more queries or requests to execute tasks is with respect to information stored in one or more datasets. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that user system is caused to display). In some embodiments, communication module 225 is configured to receive information and/or an instruction pertaining to a model such as from various client terminals or user systems. For example, communication module 225 is configured to receive a new model or an updated model from a user such as via administrator system 130. As another example, communication module 225 is configured to receive a configuration of a model stored by the system such as in model store 120. In some embodiments, communication module 225 is configured to receive information and/or an instruction pertaining to an application deployed with respect to a tenant such as from various client terminals or user systems. For example, communication module 225 is configured to receive, from a user such as via a user system or an administrator system, an indication that an application is to be deployed for a tenant, an update to an application, an instruction to download an application or a version of an application, etc. As another example, communication module 225 is configured to receive a configuration of a model stored by the system such as in model store 120. In some embodiments, communication module 225 is configured to receive information and/or an instruction pertaining to configurations (e.g., settings) pertaining to shards, models, applications, etc.

In some embodiments, system 200 comprises model module 230. According to various embodiments, model module 230 is implemented in sharding service layer 115, business application layer 110, and/or model store 120. System 200 uses model module 230 to deploy one or more models. Model module 230 is configured to receive a model that is uploaded to the system, or a pointer/address of the model from which the model is downloaded (e.g., the model may be downloaded by model module 230 or directly by a shard in response to allocation of the model to the shard). Model module 230 is configured to store information pertaining to models associated (e.g., uploaded to) system 200. For example, model module 230 stores a mapping of models to information (e.g., size, version information, etc.) pertaining to a model. As another example, model module 230 stores a mapping of models to applications.

In some embodiments, system 200 comprises model update module 235. According to various embodiments, model update module 235 is implemented in sharding service layer 115, business application layer 110, and/or model store 120. System 200 uses model update module 235 to update a model (e.g., a model loaded to one or more shards). Model update module 235 is configured to receive an indication that a model is to be updated such as by a user via a user system or an administrator system. In response to receiving the indication that the model is to be updated, model update module 235 causes the updated model to be downloaded/copied. For example, model update module 235 provides an indication of the update to system 200 such as to model allocation module 240, model allocation module 240 determines a shard to which the updated model is to be copied, and model allocation module 240 causes the updated model to be updated such as by instructing the applicable shard (e.g., the selected shard for deployment) to download the updated model, by allocating the updated model to the applicable shard (e.g., set in a configuration mapping of models to shards, and/or copied/downloaded to the shard, etc.), and/or by providing an indication to shard management module 245, which causes the updated model to be downloaded/copied.

In some embodiments, system 200 comprises model allocation module 240. According to various embodiments, model allocation module 240 is implemented in sharding service layer 115, business application layer 110, and/or model store 120. System 200 uses model allocation module 240 to allocate models across a one or more shards. Model allocation module 240 is configured to determine the one or more shards to which a particular model is to be deployed. In some embodiments, the model allocation module 240 receives an indication that a model is to be deployed to a shard. For example, the model allocation module 240 receives an indication (e.g., from model update module 235, communication module 225, etc.) that a model (e.g., an existing/deployed model) is updated, that a new model has been created and/or uploaded or otherwise indicated that the model is to be deployed, etc. In some embodiments, model allocation module 240 allocates the model based at least in part on a status or context of one or more shards (e.g., one or more shards in system 200 such as shards managed by shard management module 245). In response to allocating a model to the shard (e.g., determining that a model is to be deployed to a particular shard(s)), model allocation module 240 causes the model to be copied (e.g., downloaded) to the selected shard for deployment. As an example, model allocation module 240 provides the selected shard for deployment with an instruction to download or obtain the model. As another example, model allocation module 240 provides system 200 (e.g., shard management module 245) with an indication that the model is to be deployed at the selected shard for deployment.

According to various embodiments, model allocation module 240 determines the selected shard for deployment based at least in part on one or more of (i) an amount of available memory on a shard on which a previous version of the model is deployed (e.g., in the case of the model being an updated model), and (ii) an amount of available memory on one or more other shards currently deployed.

In some embodiments, in the case that the model to be deployed is an updated model of a model currently deployed, model allocation module 240 determines whether to deploy the updated model on the shard on which the existing model (e.g., the version prior to the update) is currently deployed (also referred to herein as the current shard) based on whether the current shard has sufficient memory to store and deploy the updated model. Sufficient memory is based at least in part on a size of the updated model. In some embodiments, sufficient memory is determined to correspond to the size of the updated model and predefined threshold amount of remaining space after the updated model is deployed. For example, the predefined threshold may be set to be a percentage of the available free memory of a shard. For example, sufficient memory may be determined to be equal to 75% of the initial available free memory of the shard. In response to determining that current shard has sufficient memory to store and deploy the updated model, model allocation module 240 deems the current shard as the shard on which the model is to be deployed (e.g., the selected shard for deployment).

In some embodiments, model allocation module 240 determines the shard on which the model is to be deployed based on a cost function associated with deployment of the model on the shard. For example, model allocation module 240 uses the cost function in connection with computing a value corresponding to deployment of the model on one or more shards such as one or more existing shards. In some implementations, model allocation module 240 uses the cost function to compute corresponding to deployment of the model on a new shard (e.g., a shard that would be created to deploy the model). The value computed using the cost function corresponds to a metric associated with an expected cost or performance of deploying the model on the corresponding shard. The cost function corresponds to a function based on one or more variables associated with the corresponding shard and/or model to be deployed. In some implementations the cost function may comprise respective weightings for the one or more variables. Examples of the one or more variables include an amount of traffic to the shard (e.g., an average amount of traffic, an amount of traffic over a predetermined amount of time, etc.), an available memory of the shard, a size of the tenant associated with the model to be deployed, a bandwidth for the shard, an number of queries sent to the shard (e.g., an average number of queries, a number of queries over a predefined period of time, etc.), CPU usage, a predicted performance (e.g., based on a performance model, a simulation, and/or testing of the model on the shard or replica of the shard using real traffic), a number of users associated with a tenant for which a model is on the shard, an average number of transactions associated with a tenant over a corresponding predefined period of time, etc. Various other variables may be implemented. According to various embodiments, model allocation module 240 selects the selected shard for deployment based on a shard having an optimal value corresponding to the cost function (e.g., a shard for which the corresponding value of the cost function is highest among the existing shard and/or a potential new shard). In some embodiments, model allocation module 240 uses the values corresponding to the cost function for the plurality of shards (e.g., a shard for which the corresponding value of the cost function is highest among the existing shard and/or a potential new shard) to select a "good enough" shard, such as a shard for which the value corresponding to the cost function satisfies one or more predefined threshold (e.g., a value of the cost function is lower than a predefined threshold value such as a value indicating that the cost of the deployment is less than the predefined cost threshold). As an example, model allocation module 240 iterates through the plurality of shards and computes a corresponding value of the cost function until model allocation module 240 determines that a shard has a value of the cost function that satisfies the one or more predefined thresholds. If model allocation module 240 iterates through all existing shards, then model allocation module 240 determines that model is to be allocated/deployed to a new shard.

In some embodiments, system 200 comprises shard management module 245. According to various embodiments, shard management module 245 is implemented in sharding service layer 115, business application layer 110, and/or model store 120. System 200 uses shard management module 245 to manage shards (e.g., configure a shard, delete a shard, create a shard, update a shard, restart a shard, etc.). In some embodiments, system 200 uses shard management module 245 to deploy a model to a shard (e.g., to allocate a model to a shard).

In some embodiments, shard management module 245 stores configurations or settings pertaining to a shard. For example, shard management module 245 stores information pertaining to one or more of an application on a shard, a configuration/setting of the application, a model associated with the application, a model deployed on the shard, a configuration of the operating system (e.g., information to be stored in the operating system memory of an instance of the shard), a configuration of the corresponding machine (e.g., a virtual machine), one or more instances instantiated with respect to a shard, etc. As an example, shard management module 245 stores a mapping of applications to shards such as to identify the applications that are installed (or are to be installed) on a shard. As another example, shard management module 245 stores a mapping of tenants to shards. As another example, shard management module 245 stores a mapping of models to applications and/or shards. As another example, shard management module 245 stores a mapping of configurations/settings to applications.

According to various embodiments, shard management module 245 is implemented in connection with a container-orchestration system/service for automating computer application deployment, scaling, and management (e.g., a Kubernetes™ service). For example, shard management module 245 comprises the container-orchestration system/service. In connection with deploying and managing shards, shard management module 245 establishes and manages traffic routing to a service. For example, shard management module 245 establishes and manages traffic routing to a service determines the manner by which incoming traffic to a service is routed among shards within the service. In some embodiments, shard management module 245 monitors a status of shards, and shard management module 245 detect if a shard faults. In response to determining that a node associated with the shard has experienced has a fault or has otherwise gone down, shard management module 245 is configured to spin up (e.g., create and deploy) a new node (e.g., instance). In some embodiments, shard management module 245 manages one or more shards in a manner that deploys nodes associated with instances in a particular shard across a plurality of worker nodes (e.g., instances of the shard are run on virtual machines distributed across a network system). The distribution of the instances/service across a plurality of worker nodes establishes a certain level of fault tolerance for the service. Accordingly, because a service provided by a shard is distributed across worker nodes and because pods within a service are homogenous, the service experiences no downtime when new instances have to be spun up. In some embodiments, the container-orchestration system/service routes traffic across the shards or instances within a shard based on a monitoring of a status of the shard (or instance in the shard). For example, the shard management module 245 monitors an instance or shard and routes traffic to the instance/shard in response to a determination that the instance/shard is in a ready state (e.g., in response to a determination that all models have been loaded, etc.). As an example, the shard management module 245 receives from an application on the instance/shard an indication that all the applicable models are loaded.

In some embodiments, system 200 comprises user interface module 250. System 200 uses user interface module 250 in connection with configuring information (or the display thereof) to be provided to the user such as via a user system or an administrator system. In some embodiments, user interface module 250 is implemented by database layer 105 of system 100 of FIG. 1, business application layer 110, sharding service layer 115, and/or model store 120. In some embodiments, user interface module 250 configures a user interface to be displayed at a client terminal used by the user or administrator, such as an interface that is provided in a web browser at the client terminal. In some embodiments, user interface module 250 configures the information to be provided to the user such as configuring one or more reports of information that is responsive to a query or task executed with respect to database layer 105 (e.g., a query or task executed against one or more datasets). In some embodiments, user interface module 250 configures one or more user interfaces via which a user controls or manages models (e.g., updating of models, creation of new models, etc.), shards (e.g., setting sharding policies such as policies for allocation of models across shards, configurations/settings of shards, configuration/settings of an application, etc.).

According to various embodiments, storage 215 comprises one or more of filesystem data 260, model data 265, and/or shard data 270. Storage 215 comprises a shared storage (e.g., a network storage system) and/or database data, and/or user activity data. In some embodiments, filesystem data 260 comprises a database such as one or more datasets (e.g., one or more datasets for one or more tenants, etc.). Filesystem data 260 comprises data such as a dataset for training a machine learning process, historical information pertaining user activity, a human resources database, a financial database, etc.). In some embodiments, model data 265 comprises information pertaining to one or more models available for deployment in system 200, including models deployed across one or more shards. For example, model data 265 comprises information pertaining to a size of a model, a version of the model, a status of the model (e.g., an indication that the model is pending update on a shard, an indication that the model is updated on a shard, etc.), etc. In some embodiments, shard data 270 comprises information pertaining to a shard, including configuration/settings of a shard (e.g., default settings of a shard), an application deployed on one or more shards, a model deployed on one or more shards, a status of a shard (e.g., a status of an instance, an application, a model, etc.), etc.

According to various embodiments, memory 220 comprises executing application data 275. Executing application data 275 comprises data obtained or used in connection with executing an application such as an application executing on a shard. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3A:
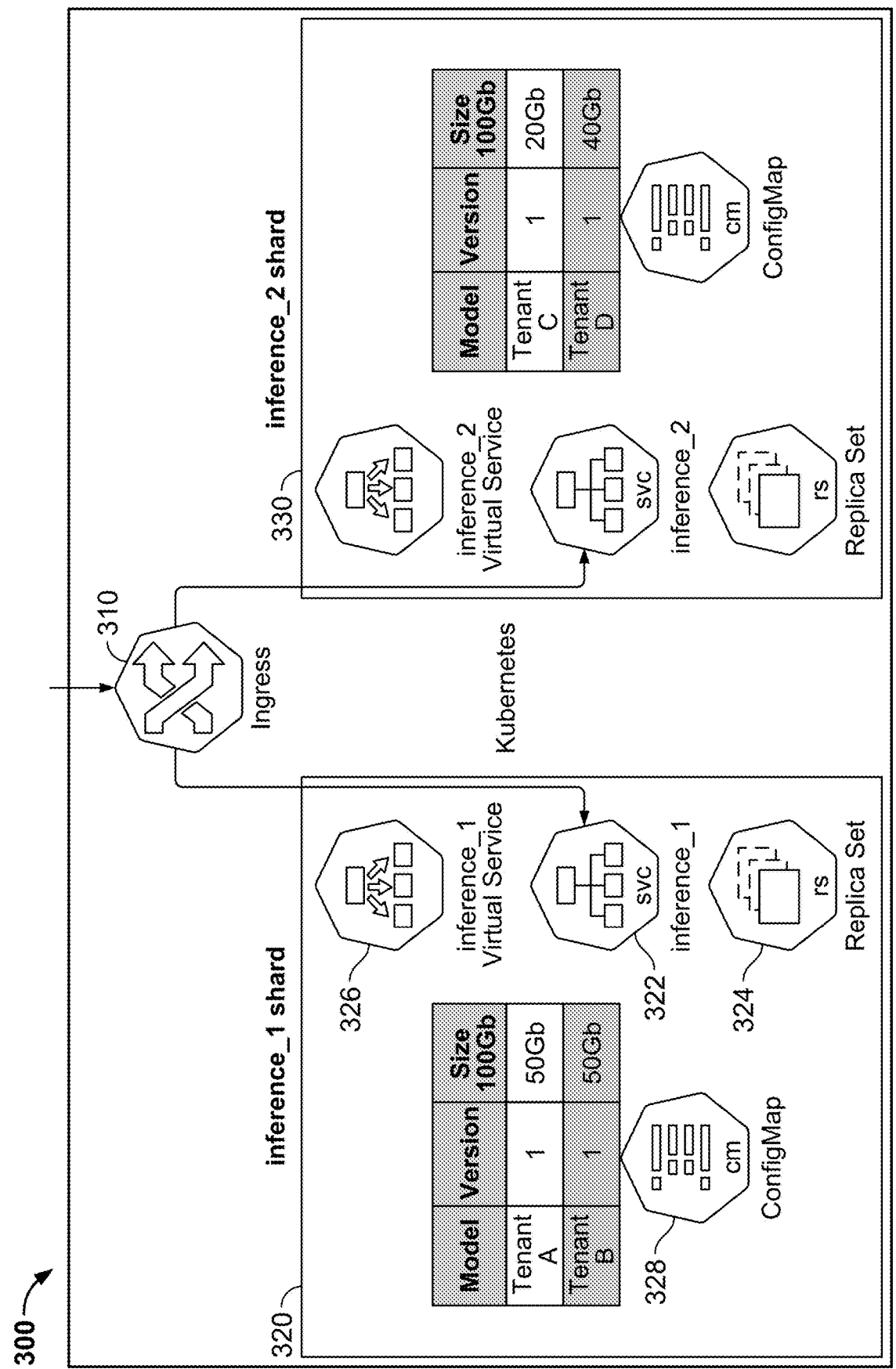
FIG. 3A is a diagram of a system for managing shards according to various embodiments of the present application.

FIG. 3A is a diagram of a system for managing shards according to various embodiments of the present application. System 300 may be implemented at least in part by system 200 of FIG. 2 and/or system 100 of FIG. 1, such as by sharding service layer 115. System 300 may implement process 400 of FIG. 4, process 500 of FIG. 5, process 600 of FIG. 6, process 700 of FIG. 7, process 800 of FIG. 8A, and/or process 850 of FIG. 8B, and/or process 1000 of FIG. 10.

In the example shown in FIG. 3A, incoming traffic to a service is received at ingress 310. In response to receiving incoming traffic, ingress 310 determines a shard to which the incoming traffic is to be routed. For example, ingress 310 determines whether to route the traffic to shard 320 or shard 330. In some embodiments, the determination of which shard to which the incoming traffic is to be routed is based on a routing table or other mapping of traffic to shard. For example, the incoming traffic is routed based on at least in part on a shard on which a model with which the incoming traffic is associated. Using the example shown in FIG. 3A, if incoming traffic is intended for a model associated with Tenant A or Tenant B, ingress 310 routes traffic to shard 320; and in contrast, if incoming traffic is intended for a model associated with Tenant C or Tenant D, ingress 310 routes traffic to shard 330. According to various embodiments, ingress 310 buffers, caches, or redirects incoming traffic intended for a model if the corresponding shard is not fully ready (e.g., if the shard is being restarted such as in response to an update of a model stored thereon, or if the allocating of the model to the shard is not fully complete such as if the shard has not fully/successfully downloaded the model, etc.). In some embodiments, ingress 310 routes incoming traffic to the applicable shard, and the shard buffers or caches the incoming traffic until the shard is ready (e.g., the model and/or application is loaded). Routing of incoming traffic to ingress 310 may be based at least in part on routing that is configured by a virtual service associated with a shard such as virtual service 326. In some embodiments, virtual service 326 dynamically updates a mapping of tenants associated with shard 320. For example, virtual service 326 determines one or more tenants associated with models deployed on shard 320, and virtual service configures routing of traffic to the one or more tenants. As another example, virtual service 326 determines one or more models deployed on shard 320, and configures a routing of traffic for a service provided by a model on shard 320. The configuring of the routing of traffic comprises storing of a mapping of models to shards, registering a traffic route directed to a particular model with another service such as ingress 310, etc. In response to a change/update of a tenant or model associated with a shard, virtual service 326 updates the configuration of traffic for the service.

In some embodiments, a shard comprise an inference service. As illustrated in FIG. 3A, shard 320 comprises inference service 322. Inference service 322 routes incoming traffic to shard 320 to an applicable instance. As an example, shard 320 comprises a plurality of instances corresponding to replica set 324. In response to ingress 310 routing traffic to shard 320, inference service 322 determines an instance in replica set 324 to which the incoming traffic (e.g., a query) is to be directed. In some embodiments, the incoming traffic to a shard is routed among the instance in the shard according to a round-robin deployment (e.g., a first query is routed to a first instance, a second query is routed to a second instance, a third query is routed to a third instance, etc.). For example, inference service 322 employs a round-robin deployment or routing of the incoming traffic received from ingress 310 and routes traffic according to such a deployment/routing scheme to instances comprised in replica set 324. In some embodiments, the incoming traffic to a shard is routed among the instance in the shard according to an available capacity (e.g., a measure of a size of a queue of tasks/queries for an instance, a measure of a time/estimated time of completion of servicing the traffic for an instance, a bandwidth of an instance, etc.).

According to various embodiments, a configuration mapping (e.g., configuration mapping 328) is stored in association with a shard (e.g., shard 320). The configuration mapping stores information pertaining to models deployed on the shard. For example, the information pertaining the model includes a name or identifier associated with the model, a model version, and a size of the model. Other information associated with a model deployed on the shard may be stored in the configuration mapping. In some embodiments, configuration mapping 328 is stored on shard 320 or otherwise in association with a configuration/setting of shard 320. In some embodiments, the configuration mapping 328 is read to determine the models on the shard 320 (e.g., models allocated to shard 320), and the models indicated on configuration mapping 328 are copied/downloaded to shard 320.

Figure 3B:
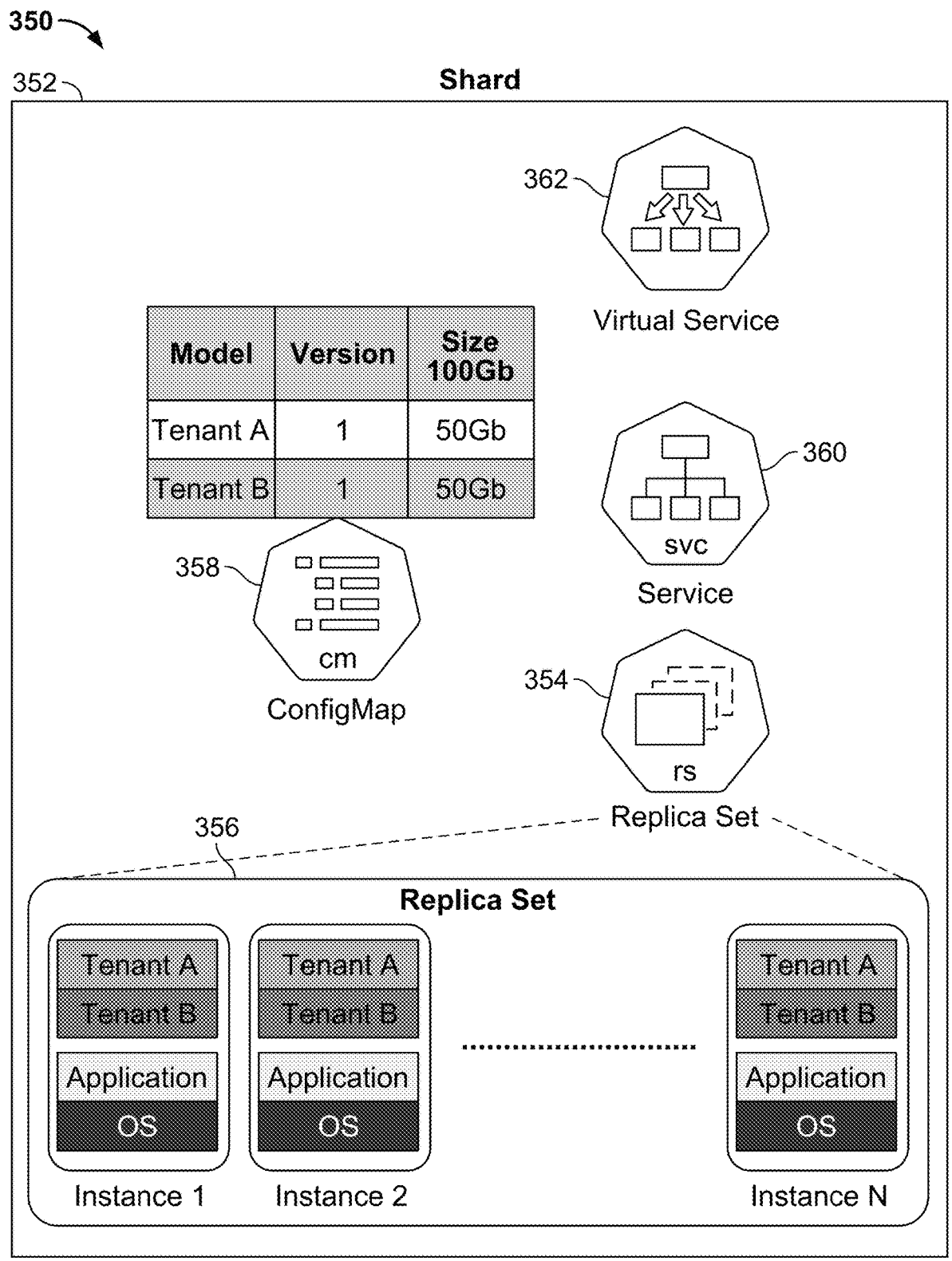
FIG. 3B is a diagram illustrating an embodiment of a shard.

FIG. 3B is a diagram illustrating an embodiment of a shard. In some embodiments, shard 352 is used to implement shard 320 of FIG. 3A or shard 330 of FIG. 3A. In the example shown, shard 352 comprises replica set 354 of N instances 356. Each instance of N instances 356 runs a copy of an application, operating system, and each of instance will load models or a portion of the models for Tenant A and Tenant B into memory. Shard 352 includes configmap 358, which includes the metadata associated with one or more models, this metadata is used to uniquely identify the one or more models to be able to download it (from the model store service). Shard 352 includes service 360, which is the equivalent to a unique DNS entry within Kubernetes. Shard 352 includes a virtual service 362, which includes routing logic to route traffic for Tenant A and Tenant B to service 360. Service 360 will then route the traffic to any one of the instances of replica set 354.

Figure 4:
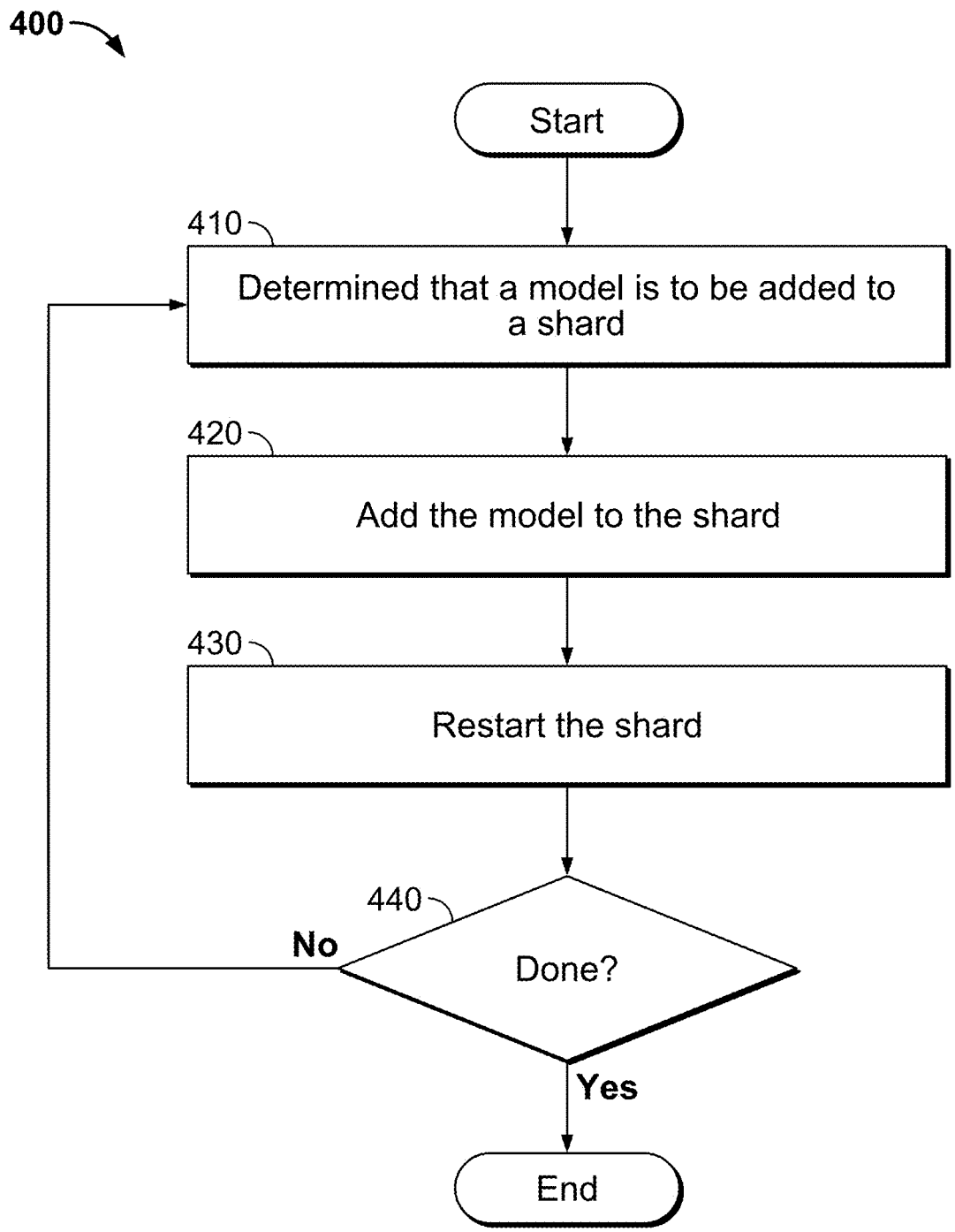
FIG. 4 is a flow diagram of a method for managing sharding according to various embodiments of the present application.

FIG. 4 is a flow diagram of a method for managing sharding according to various embodiments of the present application. In some embodiments, process 400 is implemented by system 100 of FIG. 1, system 200 of FIG. 2, and/or system 300 of FIG. 3A. Process 400 may be implemented in connection with process 500 of FIG. 5, process 600 of FIG. 6, process 700 of FIG. 7, process 800 of FIG. 8A, and/or process 850 of FIG. 8B, and/or process 1000 of FIG. 10.

At 410, a determination is made that a model is to be added to a shard. According to various embodiments, the system determines that the model is to be added to the shard in response to determining that the model is created or updated (e.g., that the model is an updated model of a model currently deployed). As an example, the system (e.g., the sharding service) determines to add the model to the shard based at least in part on an instruction from a user (e.g., an uploading of the model to the system or a creation of a record for the model that includes an address from which the model is to be obtained). As another example, the system automatically determines to add the model to the shard without human/manual intervention in response to a determination that the model is available for deployment (e.g., that the model is created, updated, etc.).

In some embodiments, the system determines that a model is to be added to a shard based at least in part on a configuring a list or mapping of models to a shard. For example, the system or administrator updates a mapping of models to shards, and the update causes the applicable shard(s) (e.g., the shard(s) affected by the update) to update the model(s) that such shard(s) deploy. As an example, each of one or more shards (e.g., application(s) installed on the shard) are configured to periodically check the list or mapping of models associated with the particular shard, and to configure itself to reflect to the current set of models associated with the particular shard (e.g., the shard automatically downloads any models identified in the list or mapping for which the shard does not already deploy, and the shard may automatically delete any existing models on the shard which are not included in the list or mapping of models for the shard).

In some embodiments, the model to be added to the shard is associated with a first tenant, and shard on which the model is to be deployed (e.g., the selected shard for deployment) comprises a different model that is associated with a second tenant, such second tenant being different from the first tenant. As an example, after deployment of the model to be added to the shard, the shard comprises a plurality of models corresponding to a plurality of tenants.

According to various embodiments, the determining to add the model to the shard comprises determining the shard on which the model is to be deployed (e.g., the selected shard for deployment). As an example, the system determines the selected shard for deployment based at least in part on a predetermined cost function (also referred to herein as the cost function). In some embodiments, the predetermined cost function is based at least in part on an amount of available memory on the shard. In some embodiments, the selected shard for deployment is determined based at least in part on one or more of (i) an amount of available memory on a shard on which a previous version of the model is deployed (e.g., in the case of the model being an updated model), and (ii) an amount of available memory on one or more other shards currently deployed.

In some embodiments, in the case that the model to be deployed is an updated model of a model currently deployed, the system determines whether to deploy the updated model on the shard on which the existing model (e.g., the version prior to the update) is currently deployed (also referred to herein as the current shard) based on whether the current shard has sufficient memory to store and deploy the updated model. For example, the cost function indicates that the selected shard for deployment corresponds to the current shard if the current shard has sufficient memory. As an example, sufficient memory corresponds to a size of the updated model. In some embodiments, sufficient memory is determined to correspond to the size of the updated model and a predefined threshold amount of remaining space after the updated model is deployed. The predefined threshold may be set to be a percentage of the available free memory of a shard. For example, sufficient memory may be determined to be equal to 75% of the initial available free memory of the shard. Various other percentages of the initial available free memory of the shard may be implemented in connection with the predefined threshold. In some embodiments, the predefined threshold is configurable. In some embodiments, the initial available free memory of the shard corresponds to the available memory after the overhead (e.g., the memory used to store an application and the memory used to store an operating system). In some embodiments, if the amount of available memory on the current shard is greater than the size of the model, a corresponding value of the cost function indicates that deployment of the model on the current is optimal. According to various embodiments, in the case of an updated model, the amount of available memory on the current shard that corresponds to sufficient memory to deploy the model thereon is the difference in size between the updated model and the existing model (e.g., because the updated model will be used to replace the existing model and the existing model would be deleted from the current shard upon deployment of the updated model).

In some embodiments, the cost function used in connection with determining the selected shard for deployment comprises determining an amount of available memory on a set of existing shards. For example, the system determines the amount of available memory for each of the existing shards. In some embodiments, the system sorts the existing shards according to an amount of available memory, and the selected shard for deployment is determined to be the existing shard having a greatest amount of available memory. In some embodiments, the system sorts the existing shards in descending order according to an amount of available memory, and the system iterates through the sorted list of existing shards and determines the first existing shard that has sufficient available memory to store/deploy the model. As an example, the first existing shard that has sufficient available memory to store/deploy the model is determined to be the selected shard for deployment.

In some embodiments, the determining the selected shard for deployment comprises determining, for one or more existing shards, a corresponding value associated with a cost function. The cost function is computed based on one or more variables associated with the corresponding shard and/or model to be deployed. In some embodiments, the cost function comprises respective weightings for the one or more variables. Examples of the one or more variables include an amount of traffic to the shard (e.g., an average amount of traffic, an amount of traffic over a predetermined amount of time, etc.), an available memory of the shard, a size of the tenant associated with the model to be deployed, a bandwidth for the shard, an number of queries sent to the shard (e.g., an average number of queries, a number of queries over a predefined period of time, etc.), CPU usage, a predicted performance (e.g., based on a performance model, a simulation, and/or testing of the model on the shard or replica of the shard using real traffic), a number of users associated with a tenant for which a model is on the shard, an average number of transactions associated with a tenant over a corresponding predefined period of time, an expected remaining amount of available memory if the model is deployed in the shard, etc. Various other variables may be implemented. An example of a cost function is: cost w1*CPU_cost+w2*traffic_cost+ w3*User_provided_additional_cost, where w1, w2, and w3 are configurable weightings that add up to 1 (or 100%). For example, w1=0.3, w2=0.4, and w3=0.3 (e.g., 30%, 40%, and 30%, respectively).

In some embodiments, in the case that the model to be deployed is a new model, the system determines the selected shard for deployment based at least in part on whether an existing shard has sufficient memory to store and deploy the updated model. For example, the cost function indicates that the selected shard for deployment corresponds to an existing shard if at least one existing shard has sufficient memory. According to various embodiments, the cost function is implemented in a manner similar to the case when the model to be deployed is an updated model. If the cost function indicates that no existing shard exists on which the model is to be deployed (e.g., no existing shard has sufficient memory to deploy the model), the system determines to create a new shard. In response to determining to create a new shard, the system causes a new shard to be created (e.g., an instruction is provided to sharding service layer to create a new shard). As an example, if the new shard is deemed to be the selected shard for deployment.

According to various embodiments, the shard on which the model is to be deployed is based on metadata comprised in (or associated with) the model. In some embodiments, a model comprises metadata that indicates whether the model is to be deployed on a shard of its own. For example, the metadata can be used to indicate that the model requires to be used on its own shard (e.g., without any other models deployed on the shard).

At 420, the model is added to the shard. According to various embodiments, in response to determining to selected shard for deployment, the system causes the model to be copied (e.g., downloaded) to the selected shard for deployment.

In some embodiments, adding the model to the shard comprises sending the model to the shard. In some embodiments, the adding the model to the shard comprises providing a service that manages the shard (e.g., the sharding service layer 115 of FIG. 1) with an instruction to add the model to the shard and an address of, or pointer to, the model. The instruction to add the model comprises an identifier associated with the model. In some embodiments, the instruction to add the model further comprises version information and/or size information pertaining to the model. In response to receiving the instruction to add the model to the shard, the service that manages the shard causes the model to be copied to the shard.

In some embodiments, adding the model to the shard comprises the shard configuring itself to reflect a list or mapping of models associated with the shard. As an example, the shard automatically downloads any models identified in the list or mapping for which the shard does not already deploy, and the shard may automatically delete any existing models on the shard which are not included in the list or mapping of models for the shard.

At 430, the shard is restarted. According to various embodiments, the system restarts the shard after the model is added to the shard. For example, in response to determining that the model is completely (e.g., successfully) added to the shard, the system causes the shard to restart. As an example, the shard is restarted to enable an application running on the shard to use the model. In some cases, an application is unable to use a model that was not available at runtime of the application, and thus a restart of the application/shard after the model is added to the shard to cause the model to be available to the application when the application is booted/loaded.

According to various embodiments, traffic to the service associated with the model is buffered/cached until after the shard is ready, such as after the shard is restarted (e.g., the application is booted). In response to determining that the shard is ready, the buffered traffic to the service is routed to be service in connection with implementing the model, and the rules for routing the traffic associated with the service are established for routing such traffic to the shard. As an example, the rules for routing the traffic associated with the service are configured based on a list or mapping of tenants to shards. In response to a determination that a mapping of tenants to a particular shard is updated (e.g., due to a moved model), the corresponding rules for routing traffic are updated.

At 440, a determination is made as to whether process 400 is complete. In some embodiments, process 400 is determined to be complete in response to a determination that no further models are to be moved (e.g., added to shards), a user has indicated that no further models are to be moved, the user has exited the system, an administrator indicates that process 400 is to be paused or stopped, etc. In response to a determination that process 400 is complete, process 400 ends. In response to a determination that process 400 is not complete, process 400 returns to 410.

Figure 5:
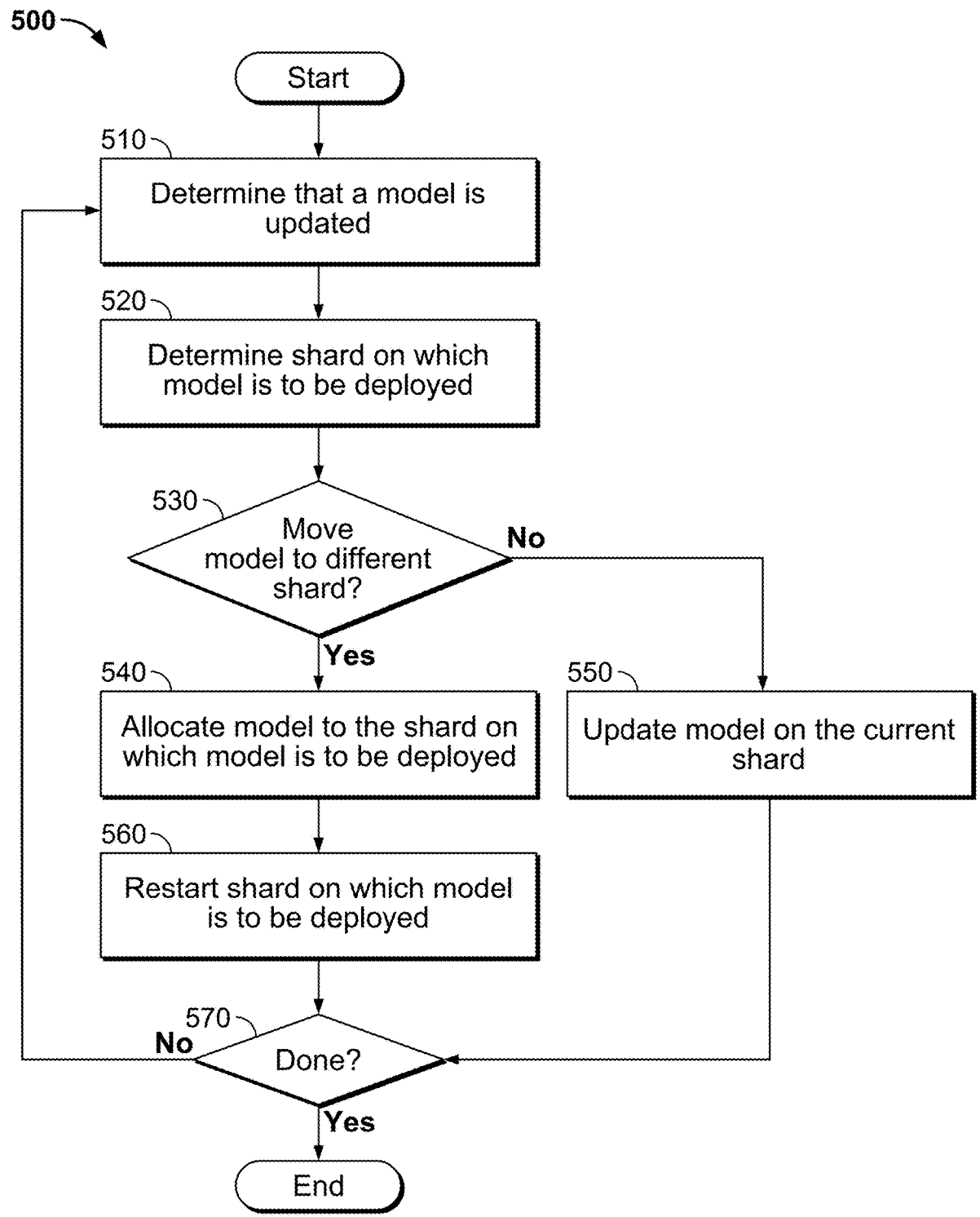
FIG. 5 is a flow diagram of a method for managing sharding according to various embodiments of the present application.

FIG. 5 is a flow diagram of a method for managing sharding according to various embodiments of the present application. In some embodiments, process 500 is implemented by system 100 of FIG. 1, system 200 of FIG. 2, and/or system 300 of FIG. 3A. Process 500 may be implemented in connection with process 400 of FIG. 4, process 600 of FIG. 6, process 700 of FIG. 7, process 800 of FIG. 8A, and/or process 850 of FIG. 8B, and/or process 1000 of FIG. 10.

At 510, a model is determined to be updated. In some embodiments, the system determines that a model is updated in response to the model being uploaded to the system such as to model store 120, or a user providing a user input that indicates that an updated model (e.g., new version of the model) to the system such as sharding service layer 115. As an example, the user provides a pointer or address to the updated model. In some embodiments, the system obtains information pertaining to the model such as version information, size information, and an indication of one or more tenants with which the model is associated, etc. As an example, the user provides the system with information pertaining to the updated model. As another example, the system obtains the information pertaining to the updated model from a third party service or from metadata associated with the updated model.

In some embodiments, the system determines that a model is updated in connection with a periodic check performed by a shard on which the existing model (e.g., the prior version of the model) is deployed to determine whether a newer version is available. As an example, one or more shards within the system, such as the current shard, are configured to perform periodic updates of the models installed thereon. For example, the current shard performs a check at a predefined interval to determine whether a more recent version of a model is available. In some embodiments, the checking to determine whether a more recent version of a model is available includes performing a lookup or query with respect to models of the system such as via querying model store 120 of system 100.

At 520, a shard on which the model is to be deployed is determined. The system determines whether to deploy the shard to an existing shard or a new shard. In some embodiments, the system determines to selected model for deployment based on a predetermined cost function such as based at least in part on the available memory comprised in the existing shard(s).

In some embodiments, the predetermined cost function is based at least in part on an amount of available memory on the shard. In some embodiments, the selected shard for deployment is determined based at least in part on one or more of (i) an amount of available memory on a shard on which a previous version of the model is deployed (e.g., in the case of the model being an updated model), and (ii) an amount of available memory on one or more other shards currently deployed. In some embodiments, in the case that the model to be deployed is an updated model of a model currently deployed, the system determines whether to deploy the updated model on the shard on which the existing model (e.g., the version prior to the update) is currently deployed (also referred to herein as the current shard) based on whether the current shard has sufficient memory to store and deploy the updated model. For example, the cost function indicates that the selected shard for deployment corresponds to the current shard if the current shard has sufficient memory. As an example, sufficient memory corresponds to a size of the updated model. In some embodiments, sufficient memory is determined to correspond to the size of the updated model and a predefined threshold amount of remaining space after the updated model is deployed. For example, the predefined threshold is set to be a percentage of the updated model such as 115% of the size of the updated model. In some embodiments, if the amount of available memory on the current shard is greater than the size of the model, a corresponding value of the cost function indicates that deployment of the model on the current is optimal. According to various embodiments, in the case of an updated model, the amount of available memory on the current shard that corresponds to sufficient memory to deploy the model thereon is the difference in size between the updated model and the existing model (e.g., because the updated model will be used to replace the existing model and the existing model would be deleted from the current shard upon deployment of the updated model).

In response to a determination that the updated model is not to be deployed on the current shard (e.g., that the current shard does not have sufficient available memory to store the updated model), the system determines whether the updated model is to be added to an existing shard or to create a new shard and add the updated model to the new shard. For example, the system uses a predetermined cost function in connection with determining whether to add the updated model to an existing shard or a new shard.

In some embodiments, the use of the cost function in connection with determining the selected model for deployment includes determining the amount of available memory for the existing shard(s), sorting the existing shards according to the amount of available memory, and determining the selected model for deployment based at least in part on the sorted existing shards. For example, the system (e.g., the sharding service) sorts the existing shards in descending order according to an amount of available memory, and the system (e.g., the sharding service) iterates through the sorted list of existing shards and determines the first existing shard that has sufficient available memory to store/deploy the model.

In some embodiments, the cost function used in connection with determining the selected shard for deployment comprises determining an amount of available memory on a set of existing shards. For example, the system determines the amount of available memory for each of the existing shards. In some embodiments, the system sorts the existing shards according to an amount of available memory, and the selected shard for deployment is determined to be the existing shard having a greatest amount of available memory. In some embodiments, the system sorts the existing shards in descending order according to an amount of available memory, and the system iterates through the sorted list of existing shards and determines the first existing shard that has sufficient available memory to store/deploy the model. As an example, the first existing shard that has sufficient available memory to store/deploy the model is determined to be the selected shard for deployment.

In some embodiments, the determining the selected shard for deployment comprises determining, for one or more existing shards, a corresponding value associated with a cost function. The cost function is computed based on one or more variables associated with the corresponding shard and/or model to be deployed. In some embodiments, the cost function comprises respective weightings for the one or more variables. Examples of the one or more variables include an amount of traffic to the shard (e.g., an average amount of traffic, an amount of traffic over a predetermined amount of time, etc.), an available memory of the shard, a size of the tenant associated with the model to be deployed, a bandwidth for the shard, an number of queries sent to the shard (e.g., an average number of queries, a number of queries over a predefined period of time, etc.), CPU usage, a predicted performance (e.g., based on a performance model, a simulation, and/or testing of the model on the shard or replica of the shard using real traffic), a number of users associated with a tenant for which a model is on the shard, an average number of transactions associated with a tenant over a corresponding predefined period of time, etc. Various other variables may be implemented. According to various embodiments, the system selects the selected shard for deployment based on a shard having an optimal value corresponding to the cost function (e.g., a shard for which the corresponding value of the cost function is highest among the existing shard and/or a potential new shard). In some embodiments, the system uses the values corresponding to the cost function for the plurality of shards (e.g., a shard for which the corresponding value of the cost function is highest among the existing shard and/or a potential new shard) to select a "good enough" shard, such as a shard for which the value corresponding to the cost function satisfies one or more predefined threshold (e.g., a value of the cost function is lower than a predefined threshold value such as a value indicating that the cost of the deployment is less than the predefined cost threshold). As an example, the system iterates through the plurality of shards and computes a corresponding value of the cost function until the system determines that a shard has a value of the cost function that satisfies the one or more predefined thresholds. If the system iterates through all existing shards, then the system determines that model is to be allocated/deployed to a new shard.

According to various embodiments, the shard on which the model is to be deployed is based on metadata comprised in (or associated with) the model. In some embodiments, a model comprises metadata that indicates whether the model is to be deployed on a shard of its own. For example, the metadata can be used to indicate that the model requires to be used on its own shard (e.g., without any other models deployed on the shard).

At 530, a determination is made whether to move the model to a different shard. In some embodiments, in response to determining the shard on which the model is to be deployed, the system determines whether the model is being moved to a different shard. For example, the system determines whether the selected shard for deployment is different from the current shard.

In response to a determination that the model is to be moved to a different shard at 530, process 500 proceeds to 540 at which the model is copied to the shard on which the model is to be deployed. As an example, the allocating of the model to the shard on which the model is to be deployed includes sending the model to the shard. As another example, the allocating of the model to the shard on which the model is to be deployed includes providing the model with an address at which the shard is to download the model, and instructing and/or causing the shard to download the model. As another example, the allocating of the model to the shard on which the model is to be deployed includes causing service to send the model to the shard. As another example, the allocating of the model to the shard includes setting a configuration of a mapping of the model to the shard (e.g., the shard may then subsequently download the model, etc.).

In some embodiments, the allocating the model to the shard comprises setting/configuring a list or mapping of models associated with a shard. As an example, each of one or more shards (e.g., application(s) installed on the shard) are configured to periodically check the list or mapping of models associated with the particular shard, and to configure itself to reflect to the current set of models associated with the particular shard (e.g., the shard automatically downloads any models identified in the list or mapping for which the shard does not already deploy, and the shard may automatically delete any existing models on the shard which are not included in the list or mapping of models for the shard).

In response to a determination that the model is to be moved to a different shard at 530, process 500 proceeds to 550 at which the model on the current shard is updated. In some embodiments, the updating the model on the current shard includes deleting an existing model, and causing the updated model to be copied to the current shard. In some embodiments, the updating the model on the current shard includes modifying the existing model to in a manner that results in the updated model. For example, a difference between the updated model and the existing model is copied to the current shard. In some embodiments, the updating the model on the current shard comprises updating an allocation of models on the current shard to include an allocation of the model to the shard.

In some embodiments, the updating the model on the current model is performed automatically (e.g., further action is not required in response to a determination that the model is not being moved to a different shard). As an example, one or more shards within the system, such as the current shard, are configured to perform periodic updates of the models installed thereon. For example, the current shard performs a check at a predefined interval to determine whether a more recent version of a model is available. In some embodiments, the checking to determine whether a more recent version of a model is available includes performing a lookup or query with respect to models of the system such as via querying model store 120 of system 100.

At 560, the shard on which the model is to be deployed is restarted. According to various embodiments, the system restarts the shard after the model is added to the shard. For example, in response to determining that the model is completely (e.g., successfully) added to the shard, the system causes the shard to restart. As an example, the shard is restarted to enable an application running on the shard to use the model. In some cases, an application is unable to use a model that was not available at runtime of the application, and thus a restart of the application/shard after the model is added to the shard to cause the model to be available to the application when the application is booted/loaded.

According to various embodiments, traffic to the service associated with the model is buffered/cached until the shard is ready, such as after the shard is restarted (e.g., the application is booted with the model). In response to determining that the shard is ready, the buffered traffic to the service is routed to be service in connection with implementing the model, and the rules for routing the traffic associated with the service are established for routing such traffic to the shard. As an example, the rules for routing the traffic associated with the service are configured based on a list or mapping of tenants to shards. In response to a determination that a mapping of tenants to a particular shard is updated (e.g., due to a moved model), the corresponding rules for routing traffic are updated.

At 570, a determination is made as to whether process 500 is complete. In some embodiments, process 500 is determined to be complete in response to a determination that no further models are updated, a user has indicated that no further models are to be moved, the user has exited the system, an administrator indicates that process 500 is to be paused or stopped, etc. In response to a determination that process 500 is complete, process 500 ends. In response to a determination that process 500 is not complete, process 500 returns to 510.

Figure 6:
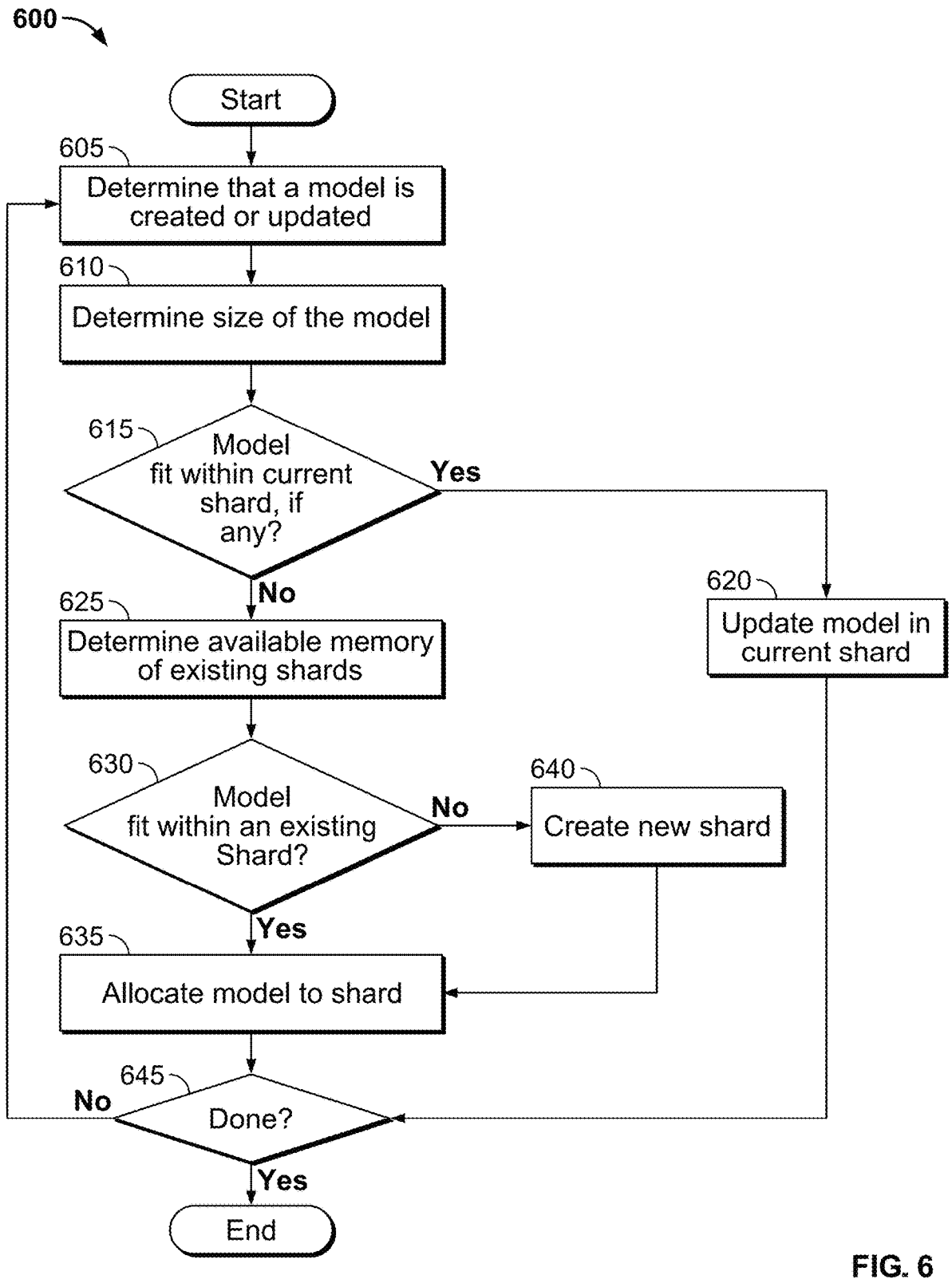
FIG. 6 is a flow diagram of a method for managing sharding according to various embodiments of the present application.

FIG. 6 is a flow diagram of a method for managing sharding according to various embodiments of the present application. In some embodiments, process 600 is implemented by system 100 of FIG. 1, system 200 of FIG. 2, and/or system 300 of FIG. 3A. Process 600 of FIG. 6 may be implemented in connection with process 400 of FIG. 4, process 500 of FIG. 5, process 700 of FIG. 7, process 800 of FIG. 8A, and/or process 850 of FIG. 8B, and/or process 1000 of FIG. 10.

At 605, a model is determined to be created. In some embodiments, the determines that a model is created based at least in part on a user input or an periodic monitoring of models available for deployment such as a mapping of information to models available in model store 120 of system 100. As an example, the system (e.g., the sharding service) determines to a model is created based at least in part on an instruction from a user in connection with an uploading of the model to the system or a creation of a record for the model that includes an address from which the model is to be obtained. As another example, the system automatically determines to add the model to the shard without human/manual intervention in response to a determination that the model is available for deployment (e.g., that the model is created, created through creating a new version of an old model (i.e., updated), etc.).

In some embodiments, the system determines that a model is updated in connection with a periodic check performed by a shard on which the existing model (e.g., the prior version of the model) is deployed to determine whether a newer version is available. As an example, one or more shards within the system are configured to perform periodic updates of the models installed thereon. For example, the current shard performs a check at a predefined interval to determine whether a more recent version of a model is available. In some embodiments, the checking to determine whether a more recent version of a model is available includes performing a lookup or query with respect to models of the system such as via querying model store 120 of system 100.

At 610, a size of the model is determined. In response to determining that the model is created or updated, the system determines the size of the model. As an example, the size of the model corresponds to an amount of memory that the model occupies (e.g., that the model is required for deployment on a shard). In some embodiments, the size of the model is determined based at least in part on a lookup with respect to a mapping of models to information pertaining to the models. Examples of the information pertaining to the models comprised in the mapping include an identifier associated with the model, a tenant associated with the model (e.g., a tenant for which the model is deployed in connection with providing a service), a size of the model, etc.

At 615, a determination is made whether the model fits within the current shard, if any. In some embodiments, in the case of an updated model, the system determines whether the current shard in which an existing model (e.g., a prior version of the model) is deployed has sufficient memory to deploy the updated model. In some embodiments, in the case of a new model (e.g., a model for which an earlier version does not exist), a current model does not exist for such model and process 600 thus proceeds to 625.

In response to a determination that the model fits within the current shard (e.g., the case of an updated model) at 615, process 600 proceeds to 620 at which the model in the current shard is updated. Process 600 then proceeds to 645.

In response to a determination that the model does not fit within the current shard (e.g., in the case of an updated model) or that the model is a new model for which a current shard is not applicable/does not exist, process 600 proceeds to 625 at which an available memory of existing shards is determined.

At 630, a determination is made as to whether the model fits within an existing shard. In some embodiments, the system determines whether any existing shard has sufficient available memory to deploy the model. The system iterates through a list of existing shards and determines whether a corresponding available memory for the particular existing shard is greater than model, or whether the available memory is greater than a value which is computed based on a size of the model (e.g., 115% the size of the model or such other value to allow the existing shard to have sufficient remaining memory to generally operate without causing a fault).

In response to a determination that the model fits within an existing shard at 630 (e.g., that the existing hard has sufficient available memory in order to deploy the model), process 600 proceeds to 635 at which the model is allocated to an applicable shard (e.g., a selected shard for deployment). Process 600 then proceeds to 645. In contrast, in response to a determination that the model does not fit within an existing shard at 630, process 600 proceeds to 640 at which a new shard is created, and process 600 then proceeds to 635 at which the model is allocated to the applicable shard (e.g., the new shard). In some embodiments, the creating the new shard comprises providing the sharding service layer (e.g., the container-orchestration system/service) with an instruction or indication to create a new shard. In some embodiments, the allocating a model to the applicable shard comprises updating a mapping of models to shards to reflect the allocation the model to the shard (e.g., to map the model to at least the shard).

In some embodiments, the determining whether the model fits with an existing shard comprises determining the shard in which the model is to be deployed (e.g., determining the selected shard for deployment). In some embodiments, the system determines to selected model for deployment based on a predetermined cost function such as based at least in part on the available memory comprised in the existing shard(s). The determining the selected model for deployment may be similar to 520 of process 500 of FIG. 5.

At 635, the model is copied/added to the shard. As an example, the allocating of the model to the shard on which the model is to be deployed includes sending the model to the shard. As another example, the allocating of the model to the shard on which the model is to be deployed includes providing the model with an address at which the shard is to download the model, and instructing and/or causing the shard to download the model. As another example, the allocating of the model to the shard on which the model is to be deployed includes causing service to send the model to the shard. As another example, the allocating of the model to the shard includes setting a configuration of a mapping of the model to the shard (e.g., the shard may then subsequently download the model, etc.).

In some embodiments, the allocating (e.g., the copying/adding) the model to the shard comprises setting/configuring a list or mapping of models associated with a shard (e.g., the selected shard for deployment, the new shard that was created to deploy the model, etc.). As an example, each of one or more shards (e.g., application(s) installed on the shard) are configured to periodically check the list or mapping of models associated with the particular shard, and to configure itself to reflect to the current set of models associated with the particular shard (e.g., the shard automatically downloads any models (or versions of models) identified in the list or mapping for which the shard does not already deploy). In some embodiments, in connection with the allocating the model to the shard, any existing models on the shard which are no longer to be deployed on the shard are deleted (e.g., the automatically deletes any existing models on the shard which are not included in the list or mapping of models for the shard). In some embodiments, an indication that a new model is mapped to a shard is pushed by to the shard. For example, in response to a new model or an updated model mapped to the shard, the system (e.g., sharding service layer 115, model store 120, etc.) pushes to shard an indication of the model having been mapped to the shard or pushes the model newly mapped the shard.

At 645, a determination is made as to whether process 600 is complete. In some embodiments, process 600 is determined to be complete in response to a determination that no further models are updated or created, a user has indicated that no further models are to be moved, the user has exited the system, an administrator indicates that process 600 is to be paused or stopped, etc. In response to a determination that process 600 is complete, process 600 ends. In response to a determination that process 600 is not complete, process 600 returns to 610.

Figure 7:
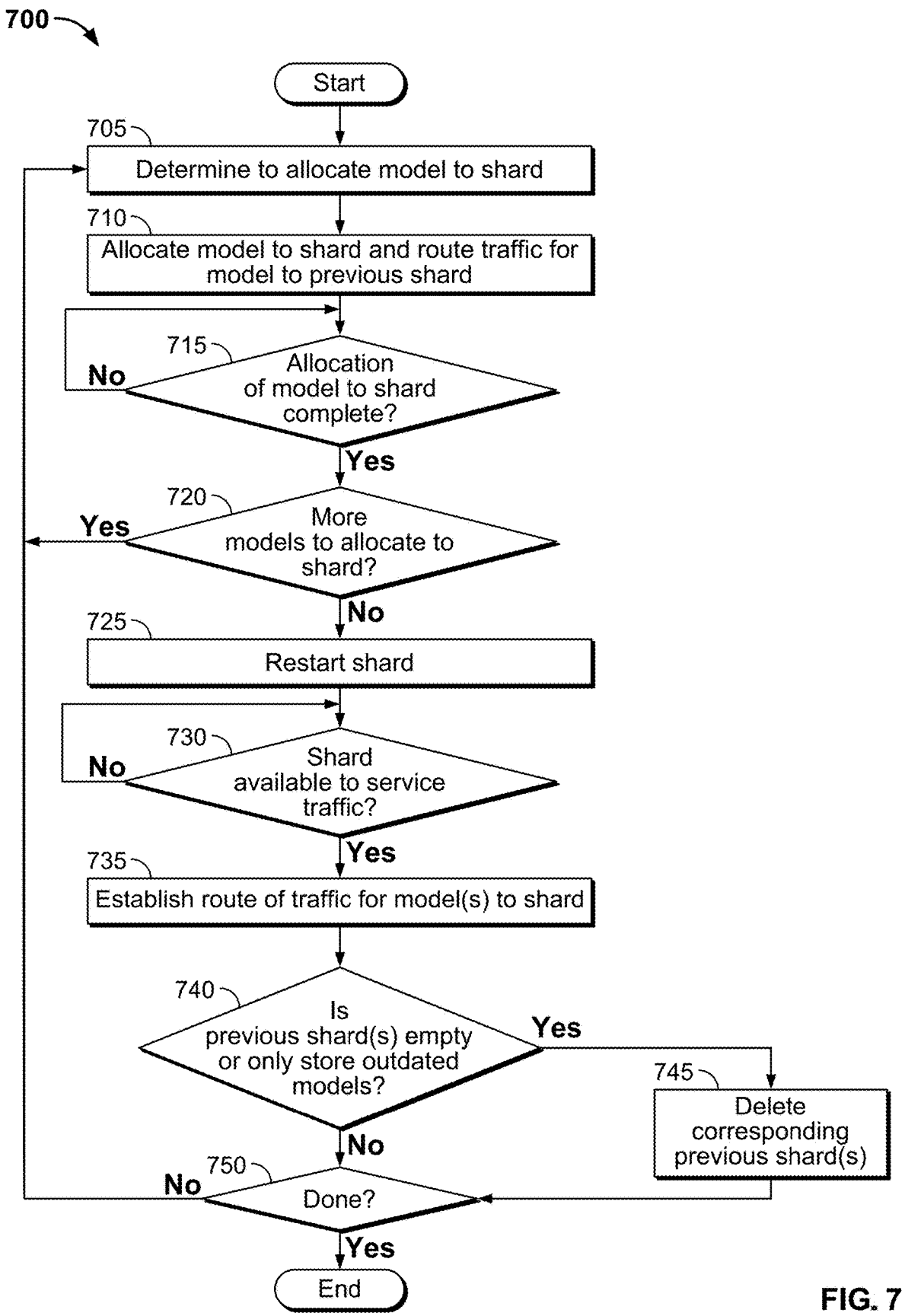
FIG. 7 is a flow diagram of a method for managing sharding according to various embodiments of the present application.

FIG. 7 is a flow diagram of a method for managing sharding according to various embodiments of the present application. In some embodiments, process 700 is implemented by system 100 of FIG. 1, system 200 of FIG. 2, and/or system 300 of FIG. 3A. Process 700 may be implemented in connection with process 400 of FIG. 4, process 500 of FIG. 5, process 600 of FIG. 6, process 800 of FIG. 8A, and/or process 850 of FIG. 8B, and/or process 1000 of FIG. 10.

In some embodiments, process 700 is performed in parallel for a plurality of shards and/or models. For example, the updating of shards is performed on a batch basis, and the shards in a batch correspondingly determine the applicable models that are to be downloaded to the shards such as based on a mapping of models to shards. In some embodiments, the shards in the batch perform the allocating of a plurality of models to be allocated to the shards in parallel (e.g., the shards download the models, restart, and load the models, etc. in parallel). In some embodiments, the shards in the batch perform the allocating of a plurality of models to be allocated to the shards in serial (e.g., the shards download the models, restart, and load the models, etc. in serial).

At 705, a model is determined to be copied to a shard. According to various embodiments, the determining to allocate the model to the shard is similar to 410 of process 400.

In some embodiments, the determining that the model is to be copied to the shard comprises determining the shard to which the model is to be copied (e.g., the selected shard for deployment). For example, the system determines the selected shard for deployment based at least in part on a predetermined cost function. In some embodiments, the predetermined cost function is based at least in part on an amount of available memory on the shard.

In some embodiments, the system determines that a model is to be copied/added to a shard based at least in part on a configuring a list or mapping of models to a shard. For example, the system or administrator updates a mapping of models to shards, and the update causes the applicable shard(s) (e.g., the shard(s) affected by the update) to update the model(s) that such shard(s) deploy. As an example, each of one or more shards (e.g., application(s) installed on the shard) are configured to periodically check the list or mapping of models associated with the particular shard, and to configure itself to reflect to the current set of models associated with the particular shard (e.g., the shard automatically downloads any models identified in the list or mapping for which the shard does not already deploy, and the shard may automatically delete any existing models on the shard which are not included in the list or mapping of models for the shard).

At 710, the model is copied to the shard and traffic for the model is routed to the previous shard, if any (e.g., if the model to be copied is an updated model). According to various embodiments, the allocating of the model to the shard is similar to 420 of process 400, 540 of process 500, and/or 635 of process 600. In response to a determination that the model is to be copied to the shard, the system configures a traffic routing for incoming traffic to the service provided by the model (e.g., the application(s) that uses the model) to buffer or cache such incoming traffic such as until the allocating of the model is complete and the shard to which the model is allocated is ready.

In some embodiments, traffic for the model is not buffered/cached while the model is copied to the shard. For example, in the case of a new model, no traffic exists for the model. As another example, in the case that a new tenant is being configured, no traffic exists for the model/tenant when the model is being copied. As another example, in the case of an updated model, the system determines not to buffer/cache the traffic because the system determines to use the previous version of the model until the updated model is ready (e.g., the updated model is deployed on the shard and the shard is ready to receive traffic for the corresponding service).

At 715, a determination is made as to whether the allocating of the model to the shard is completed.

In response to a determination that the allocating the model to the shard is not complete at 715, process 700 may continue to poll/monitor for an indication or determination that the allocating the model to the shard is complete. In some embodiments, process 700 continues to poll/monitor until completion of the allocating of the model to the shard, or until earlier receipt of an instruction from a user or service to stop process 700.

In response to a determination that the allocating the model to the shard is complete at 715, process 700 proceeds to 720 a determination is made as to whether the more models are to be copied to the shard. In response to a determination that more models are to be copied to the shard at 720, process 700 proceeds to 705. In contrast, in response to a determination that no more models are to be copied to the shard at 720, process 700 proceeds to 725 at which the shard(s) is restarted. The restarting of the shard(s) may be similar to the restarting of shards at 430 of process 400 and/or 560 of process 500.

At 730, a determination is made as to whether the shard to which the model(s) is copied is available to service traffic. In some embodiments, the system determines whether the shard to which the model(s) is copied is available to service traffic based at least in part on a determination that the model(s) is successfully copied to the shard, and a determination that the shard has restarted (and the shard/application has successfully loaded the model). In response to a determination that the model(s) is successfully copied to the shard, and a determination that the shard has restarted and/or that the model is successfully loaded in the shard, the system deems the shard available to service traffic.

In response to a determination that the shard is available to service traffic at 730, process 700 proceeds to 735. In contrast, in response to a determination that the shard is not available to service traffic at 730, process 700 iteratively determines/monitors for the availability of the shard to service traffic.

At 735, routes for traffic for the model(s) are established to the shard. In some embodiments, the system establishes traffic routes for models that have been copied to the shard in response to a determination that the shard is ready such as a determination that the shard has restarted and/or the corresponding application(s) on the shard have successfully/completely booted. In some embodiments, the establishing the traffic routes for the model(s) comprises providing/routing any traffic that was buffered for the model (e.g., while the model was copied to the shard and the shard was restarted) to the shard for the model/corresponding application to service such buffered traffic. In some embodiments, the establishing the traffic routes for the model(s) comprises configuring a mapping of tenants to shards, etc.

At 740, a determination is made as to whether the previous shard(s), if any, is empty or only stores outdated models. In the case that the model(s) is an updated model and the model(s) is moved to a new shard, the previous shard(s) still stores an earlier version of the model. In response to the model being moved (e.g., the updated model being copied) to the shard and the shard being restarted and configured to receive traffic for the corresponding service, the system determines whether the previous shard still comprises any models that are valid or otherwise providing service. In the case that the model(s) moved to the shard is a new model, the system determines that no previous models exist and process proceeds to 750.

In response to a determining that the previous shard(s) are empty or only store outdated models at 740, process 700 proceeds to 745 at which the previous shard(s) that is empty or that only stores outdated models is deleted. In some embodiments, the system (e.g., sharding service layer 115 of system 100) deletes the applicable previous shard(s) that is either empty or only store outdated models (also referred to herein as non-updated models), etc. In some embodiments, the deletion of the applicable previous shard(s) comprises updating a mapping of tenants to shards to remove a mapping of a tenant to such shard(s). In some embodiments, the deletion of the applicable previous shard(s) comprises updating a mapping of models to shards to remove any mapping of models to such shard(s), in response to which the applicable applications associated with models previously deployed on the shard deletes/frees their respective memories. According to various embodiments, the system (e.g., the sharding service layer 115) may provide an instruction to the container-orchestration system/service to delete the previous shard(s) that is empty or that only stores outdated models. For example, in response to updating the mapping of tenants to shards to empty tenant(s) mapped to the previous shard(s) that is empty or that only stores outdated models, the system instructs the container-orchestration system/service to delete such shard(s).

In response to determining that the previous(s) shards are not empty and/or do not store only outdated models at 740, process 700 proceeds to 750.

At 750, a determination is made as to whether process 700 is complete. In some embodiments, process 700 is determined to be complete in response to a determination that no further models are updated, a user has indicated that no further models are to be moved, the user has exited the system, an administrator indicates that process 700 is to be paused or stopped, etc. In response to a determination that process 700 is complete, process 700 ends. In response to a determination that process 700 is not complete, process 700 returns to 705.

Figure 8A:
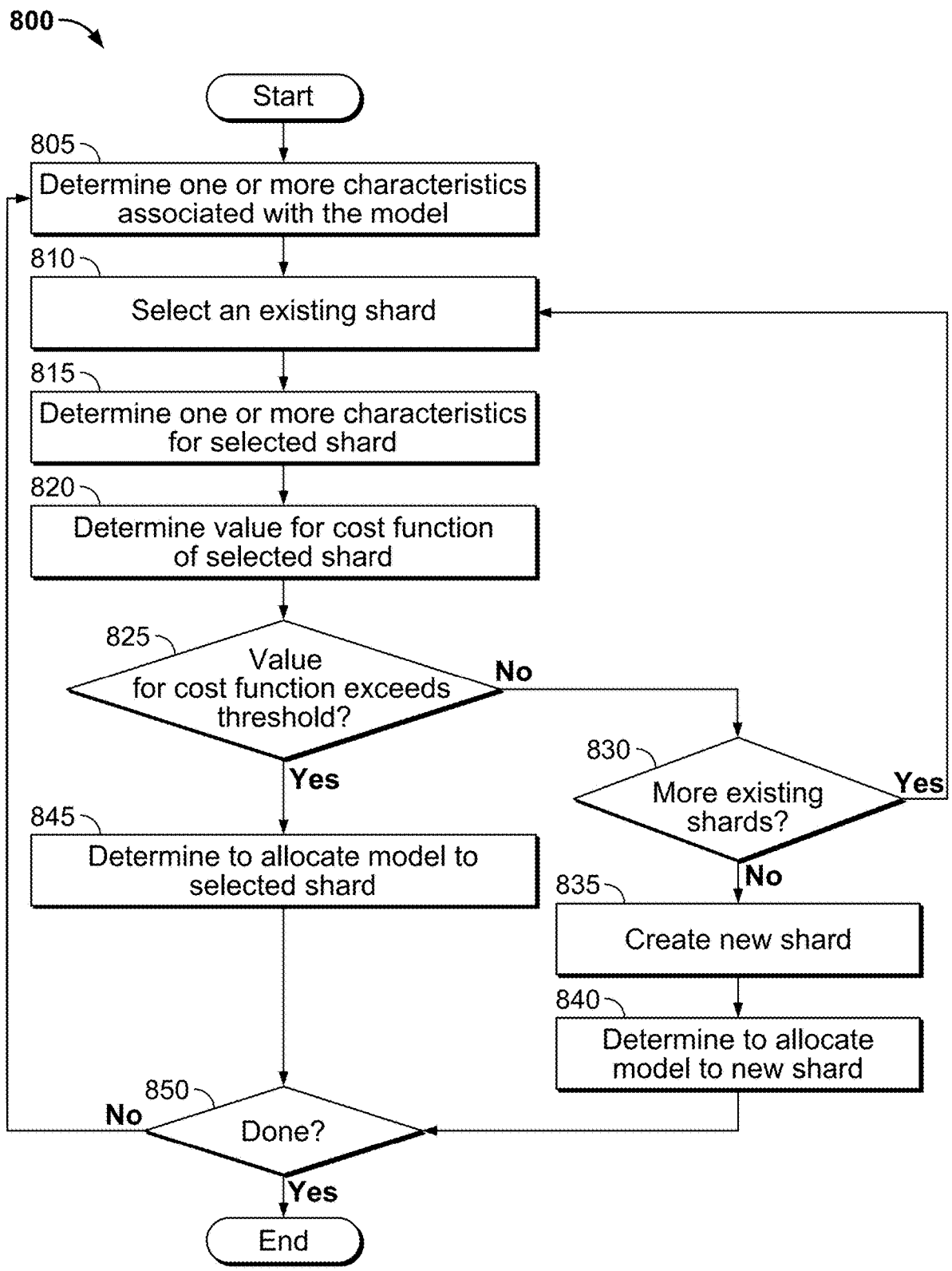
FIG. 8A is a flow diagram of a method for selecting a shard to which to allocate a model according to various embodiments of the present application.

FIG. 8A is a flow diagram of a method for selecting a shard to which to allocate a model according to various embodiments of the present application. In some embodiments, process 800 is implemented by system 100 of FIG. 1, system 200 of FIG. 2, and/or system 300 of FIG. 3A. Process 600 of FIG. 6 may be implemented in connection with process 400 of FIG. 4, process 500 of FIG. 5, process 600 of FIG. 6, process 700 of FIG. 7, and/or process 1000 of FIG. 10.

According to various embodiments, process 800 is implemented in connection with determining that a model is to be added to a shard (e.g., moving an updated model to a different shard, adding a new model to a shard, etc.). In some embodiments, process 800 is invoked in response to a determination that a new model or updated model is uploaded/received by the system (e.g., sharding service layer 115, model store 120, etc.).

According to various embodiments, process 800 is implemented in connection with select a "good enough" shard, such as a shard for which the value corresponding to the cost function satisfies one or more predefined threshold (e.g., a value of the cost function is lower than a predefined threshold value such as a value indicating that the cost of the deployment is less than the predefined cost threshold).

At 805, one or more characteristics are associated with the model are determined. In some embodiments, the one or more characteristics associated with the model correspond to a predefined cost function used for selecting the selected shard for deployment. Examples of one or more characteristics are associated with the model include an identifier of the model, version information of the model, a size of the model, a tenant associated with the model, etc.

At 810, an existing shard is selected. In some embodiments, process 800 iterates through existing shards in connection with selection the selected shard for deployment. As an example, process 800 iterates over all existing shards. As another example process 800 iterates over a subset of existing shards such as based on one or more attributes associated with the shards. Examples of the one or more attributes associated with the shards include application(s) loaded on the shard, a tenants associated with the shards, a configuration/setting of the shard (e.g., a blueprint from which the shard is created), etc.

At 815, one or more characteristics for the selected shard are determined. In some embodiments, the one or more characteristics for the selected shard correspond to a predefined cost function used for selecting the selected shard for deployment. Examples of the one or more characteristics for the selected shard pertain to one or more of an amount of traffic to the shard (e.g., an average amount of traffic, an amount of traffic over a predetermined amount of time, etc.), an available memory of the shard, a size of the tenant associated with the model to be deployed, a bandwidth for the shard, an number of queries sent to the shard (e.g., an average number of queries, a number of queries over a predefined period of time, etc.), CPU usage, a predicted performance (e.g., based on a performance model, a simulation, and/or testing of the model on the shard or replica of the shard using real traffic), a number of users associated with a tenant for which a model is on the shard, an average number of transactions associated with a tenant over a corresponding predefined period of time, etc. Various other characteristics may be implemented.

At 820, a value for a cost function is determined for the selected shard. The system determines the value for the cost function for the selected shard based at least in part on the one or more characteristics for the selected shard. The cost function is computed based on one or more variables associated with the corresponding shard and/or model to be deployed. In some embodiments, the cost function comprises respective weightings for the one or more variables. Examples of the one or more variables include an amount of traffic to the shard (e.g., an average amount of traffic, an amount of traffic over a predetermined amount of time, etc.), an available memory of the shard, a size of the tenant associated with the model to be deployed, a bandwidth for the shard, an number of queries sent to the shard (e.g., an average number of queries, a number of queries over a predefined period of time, etc.), CPU usage, a predicted performance (e.g., based on a performance model, a simulation, and/or testing of the model on the shard or replica of the shard using real traffic), a number of users associated with a tenant for which a model is on the shard, an average number of transactions associated with a tenant over a corresponding predefined period of time, an expected remaining amount of available memory if the model is deployed in the shard, an expected packing density of the shard (e.g., if the model is deployed in the shard), etc. Various other variables may be implemented.

In the example shown, the cost function is configured in a manner that a higher value for the cost function indicates a relatively better allocation of the model to a particular shard (e.g., a less overall cost, better performance, etc.).

In some embodiments, the cost function is configured in a manner that a lower value for the cost function indicates a relatively better allocation of the model to a particular shard (e.g., a less overall cost, better performance, etc.). However, in such cases where lower value for the cost function indicates a relatively better allocation of the model to a particular shard, a determination that an allocation of a model to a shard is "good enough"/satisfactory is based on a determination that the value for the cost function is below a corresponding predefined threshold (e.g., 825 is modified in such a case to determine whether the value is less than the predefined threshold).

At 825, a determination is made as to whether the value for the cost function exceeds a predefined threshold. In some embodiments, the predefined threshold is configurable such as by an administrator of the system such as via administrator system 130, or by the system according to a configuration or setting of the system. As an example, the predefined threshold is set according to an allocation of a model that is deemed satisfactory. For example, the predefined threshold is set according to a value for a cost function that indicates the allocation of the model to the applicable shard is "good enough."

In response to a determination that the value for the cost function exceeds the predefined threshold at 825, process 800 proceeds to 845 at which a determination is made to allocate the model to the selected shard. For example, the system determines that the selected shard is to be deemed the selected shard for deployment. In some embodiments, in response to determining to allocate the model to the selected shard, the system may provide an indication to allocate the model to the selected shard, or invoke a process for allocating the model to the shard. The shard to which the model is allocated may copy/download the shard in response to a determination that the model has been allocated to the shard. For example, the system invokes process 700 in response to determining to allocate the model to the selected shard. In some embodiments, in response to determining to allocate the model to the selected shard, the system updates a mapping of models to shards to associate the model with the selected shard.

At 850, a determination is made as to whether process 800 is complete. In some embodiments, process 800 is determined to be complete in response to a determination that no further models are updated or created, a user has indicated that no further models are to be moved, the user has exited the system, an administrator indicates that process 800 is to be paused or stopped, etc. In response to a determination that process 800 is complete, process 800 ends. In response to a determination that process 800 is not complete, process 800 returns to 805.

Figure 8B:
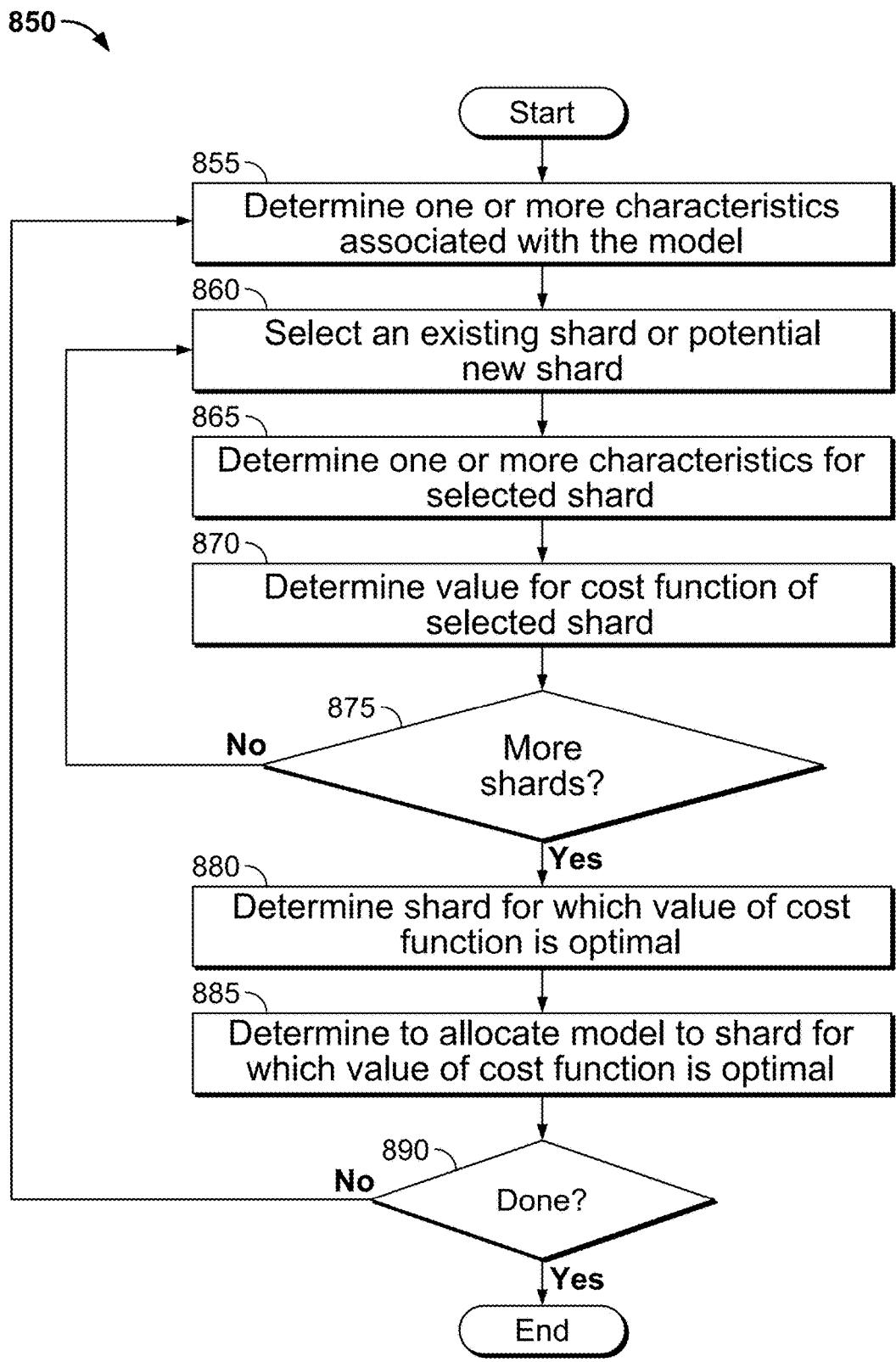
FIG. 8B is a flow diagram of a method for selecting a shard to which to allocate a model according to various embodiments of the present application.

FIG. 8B is a flow diagram of a method for selecting a shard to which to allocate a model according to various embodiments of the present application. In some embodiments, process 850 is implemented by system 100 of FIG. 1, system 200 of FIG. 2, and/or system 300 of FIG. 3A. Process 600 of FIG. 6 may be implemented in connection with process 400 of FIG. 4, process 500 of FIG. 5, process 600 of FIG. 6, process 700 of FIG. 7, and/or process 1000 of FIG. 10.

According to various embodiments, process 800 is implemented in connection with determining that a model is to be added to a shard (e.g., moving an updated model to a different shard, adding a new model to a shard, etc.). In some embodiments, process 800 is invoked in response to a determination that a new model or updated model is uploaded/received by the system (e.g., sharding service layer 115, model store 120, etc.).

At 855, one or more characteristics are associated with the model are determined. In some embodiments, the one or more characteristics associated with the model correspond to a predefined cost function used for selecting the selected shard for deployment. Examples of one or more characteristics are associated with the model include an identifier of the model, version information of the model, a size of the model, a tenant associated with the model, etc.

At 860, an existing shard or potential new shard is selected. In some embodiments, process 800 iterates through existing shards in connection with selection the selected shard for deployment. As an example, process 850 iterates over all existing shards and a potential new shard (e.g., a shard that would be created if deemed to be the optimal shard to which to allocate the model). As another example process 850 iterates over a subset of existing shards such as based on one or more attributes associated with the shards. Examples of the one or more attributes associated with the shards include application(s) loaded on the shard, a tenants associated with the shards, a configuration/setting of the shard (e.g., a blueprint from which the shard is created), etc.

At 865, one or more characteristics for the selected shard are determined. In some embodiments, the one or more characteristics for the selected shard correspond to a predefined cost function used for selecting the selected shard for deployment. In some embodiments, 865 is implemented in a manner similar to 815 of process 800.

At 870, a value for a cost function is determined for the selected shard. The system determines the value for the cost function for the selected shard based at least in part on the one or more characteristics for the selected shard. In some embodiments, 870 is implemented in a manner similar to 820 of process 800. The system stores the value for the cost function such as in a mapping of values for the cost function to models.

At 875, the system determines whether more shards exist for which the value for the cost function is to be determined in connection with iterating over the existing shard(s) and potential new shard. In response to a determination that more shards exist at 875, process 850 returns to 860. In contrast, in response to a determination that no more shards exist at 875, process 850 proceeds to 880.

At 880, the shard for which the value of the cost function is optimal is determined.

At 885, the model is determined to be copied to the shard for which the value of the cost function is optimal. In some embodiments, the system determines the selected shard for deployment to be the shard for which the value of the cost function is optimal. In some embodiments, in response to determining that the model is to be copied to the shard for which the value of the cost function is optimal, the system provides an indication or instruction for the model to be copied to the selected shard for deployment. As an example, the system updates a mapping of models to shards to associate the model with the selected shard for deployment. As another example, a list of models deployed on the selected shard for deployment is updated to include the model. In some embodiments, in response to the mapping of models to shards being updated, the shard automatically obtains (e.g., downloads) the model based at least in part on the mapping of models to the shard.

At 890, a determination is made as to whether process 850 is complete. In some embodiments, process 850 is determined to be complete in response to a determination that no further models are to be moved or allocated to a shard, a user has indicated that no further models are to be moved, the user has exited the system, an administrator indicates that process 850 is to be paused or stopped, etc. In response to a determination that process 850 is complete, process 850 ends. In response to a determination that process 850 is not complete, process 850 returns to 855.

Figure 9A:
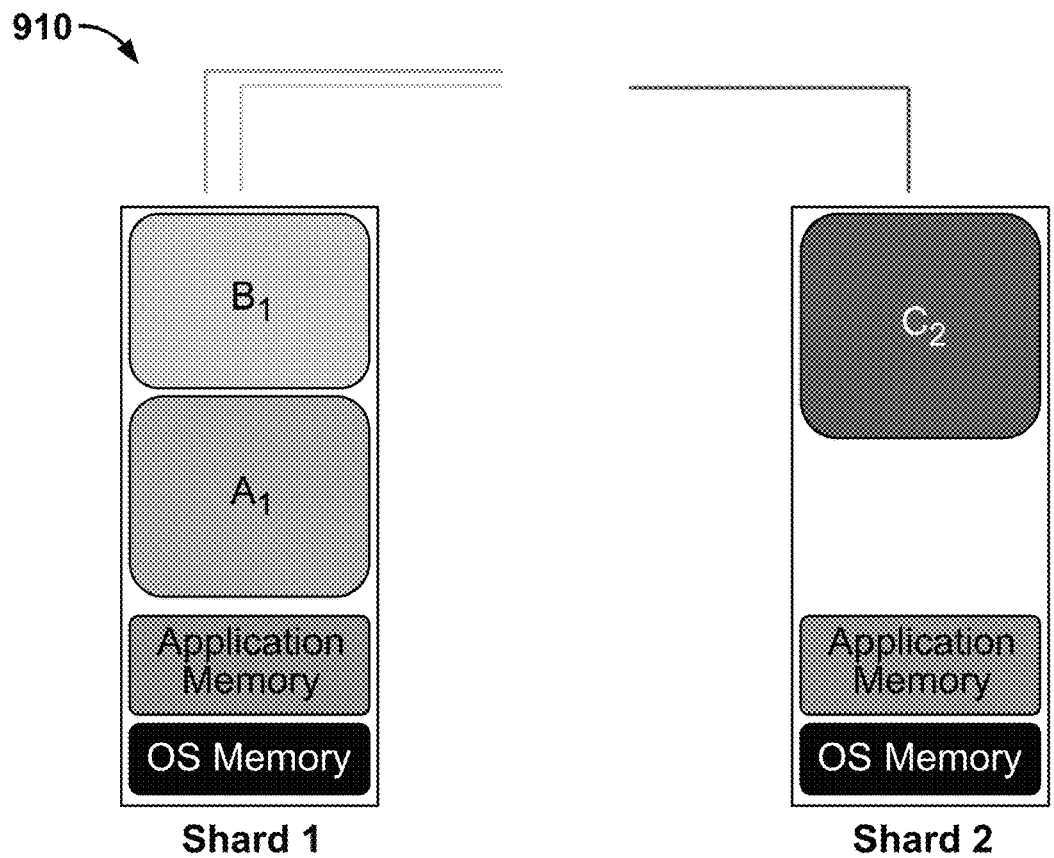
FIG. 9A is a diagram of a deploying one or more shards according to various embodiments of the present application.
Figure 9B:
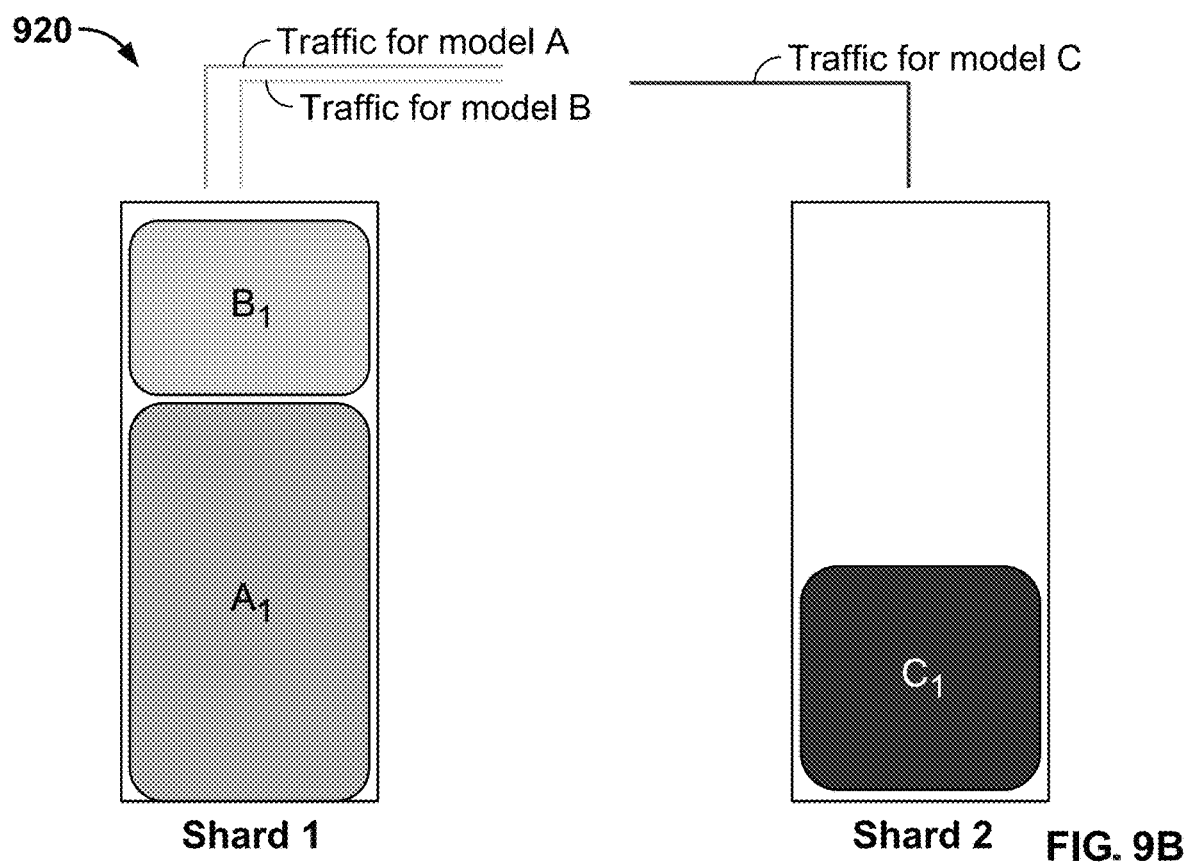
FIG. 9B is a diagram of a deploying one or more shards according to various embodiments of the present application.
Figure 9C:
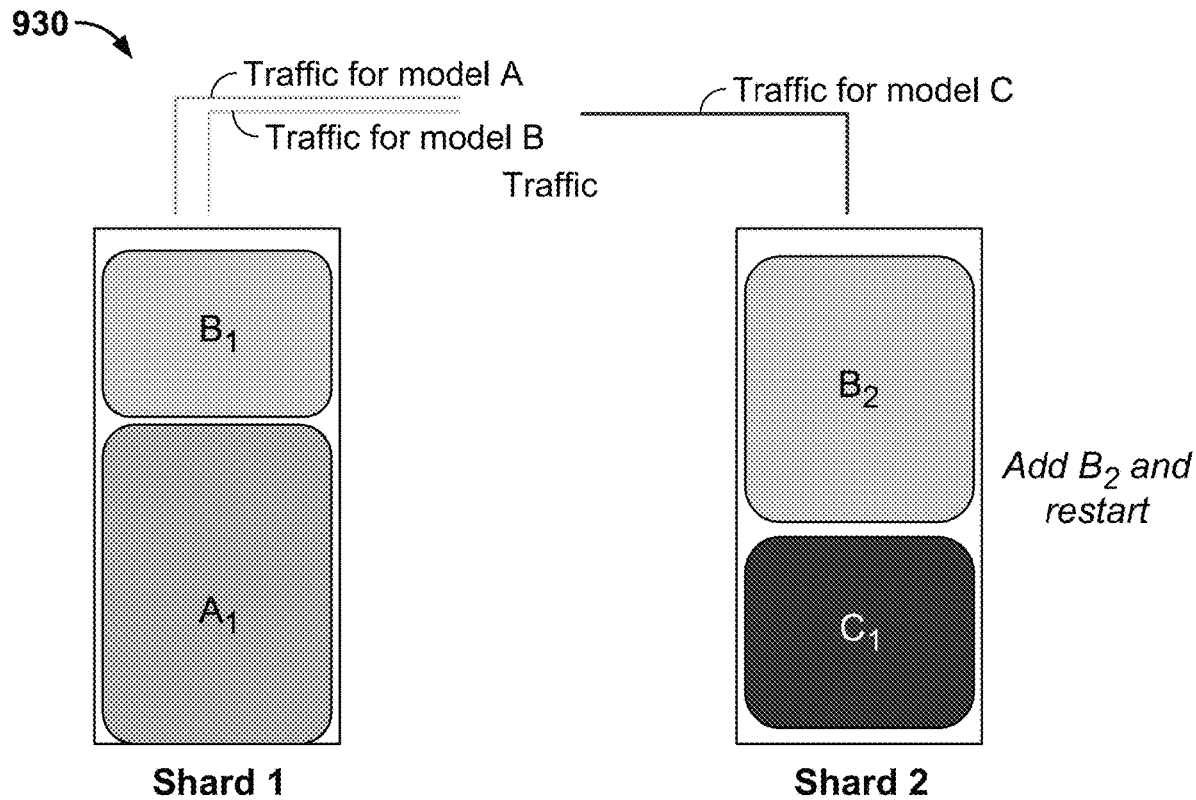
FIG. 9C is a diagram of a deploying one or more shards according to various embodiments of the present application.

FIG. 9A is a diagram of a deploying one or more shards according to various embodiments of the present application. In the example shown in system 910, shard 1 comprises model B (version 1), and model A (version 1), and shard 2 comprises model C (version 2). Shard 1 and shard 2 respectively further comprise application memory and operating system memory. As illustrated between shard 1 and shard 2, application memory and operating system memory serves as an overhead that is comprised in each instance of each shard.

Figure 9D:
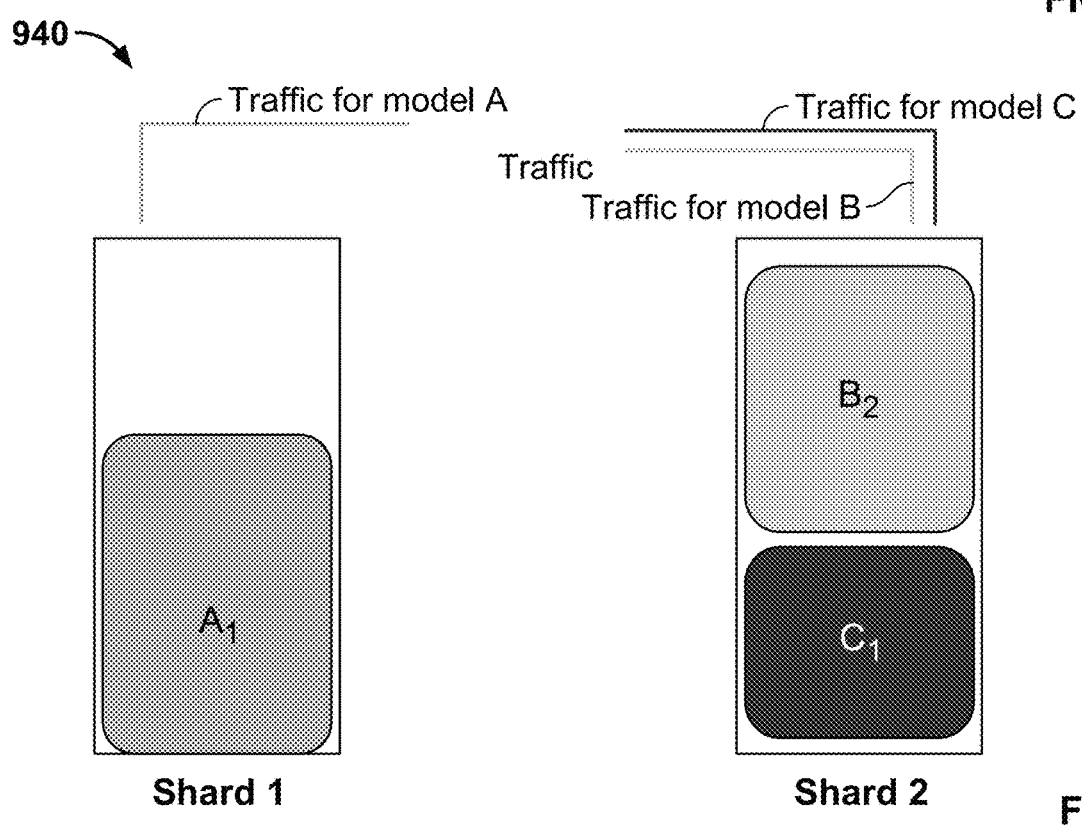
FIG. 9D is a diagram of a deploying one or more shards according to various embodiments of the present application.
Figure 9E:
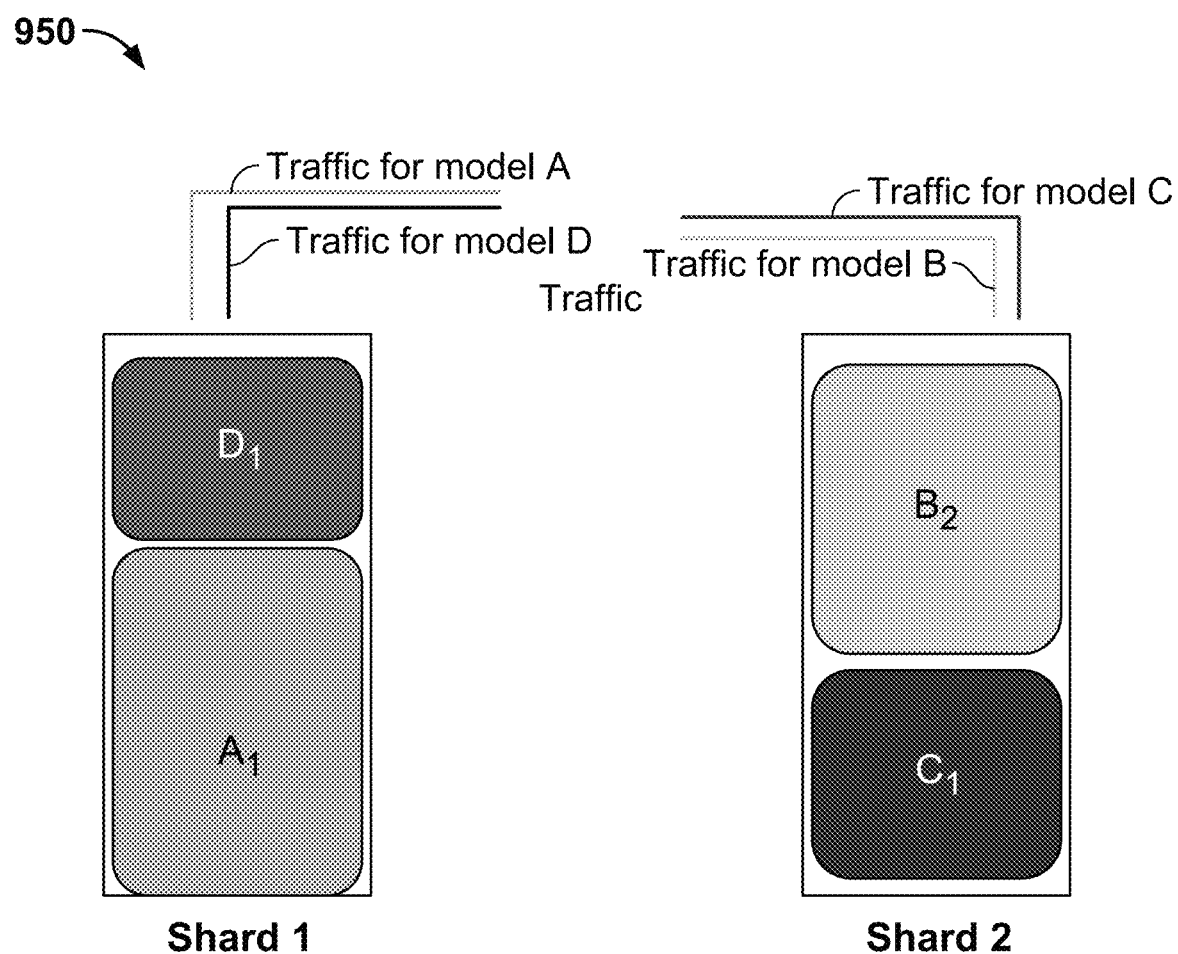
FIG. 9E is a diagram of a deploying one or more shards according to various embodiments of the present application.

FIG. 9B-9E are diagrams of a deploying one or more shards according to various embodiments of the present application. In the example shown in system 920, shard 1 comprises model B (version 1), and model A (version 1); and shard 2 comprises model C (version 1). In the example shown in system 930, model B is updated to version 2, and the updated model B is larger than the existing model (e.g., version 2 of model B is larger than version 1 of model B). As illustrated with respect to system 930, shard 1 comprising model A (version 1) and the existing model of model B (version 1) is relatively full with insufficient capacity to store the updated model of model B (version 2). In response to determining shard 1 does not have sufficient available memory to deploy the updated model, the system determines to move the updated model of model B (version 2). For example, the system determines to add/allocate model B (version 2) to existing shard 2. As illustrated with respect to system 930 in FIG. 9C, model B (version 2) is added to shard 2. Upon completion of adding model B to shard 2, shard 2 is restarted. As further illustrated in FIGS. 9B and 9C, traffic for model A and model B is routed to shard 1, and traffic for model C is routed to shard 2. However, as illustrated in FIG. 9D, after shard 2 is restarted after model B (version 2) is added to shard 2, the routing of traffic to model B is updated to be routed to shard 2. Further, as illustrated with respect to system 940 in FIG. 9D, model B (version 1) is deleted from shard 1 (or at least the mapping of model B to shard 1 is deleted/removed). As illustrated with respect to system 950 of FIG. 9E, a new model (e.g., model D) is created. The system determines that shard 1 has sufficient available memory to store/deploy model D. Accordingly, model D (version 1) is added to shard 1. In some embodiments, after adding model D (version 1) to shard 1, shard 1 is restarted. Further, as illustrated in FIG. 9E, the traffic routing is updated such that incoming traffic for traffic model D is routed to shard 1.

Figure 10:
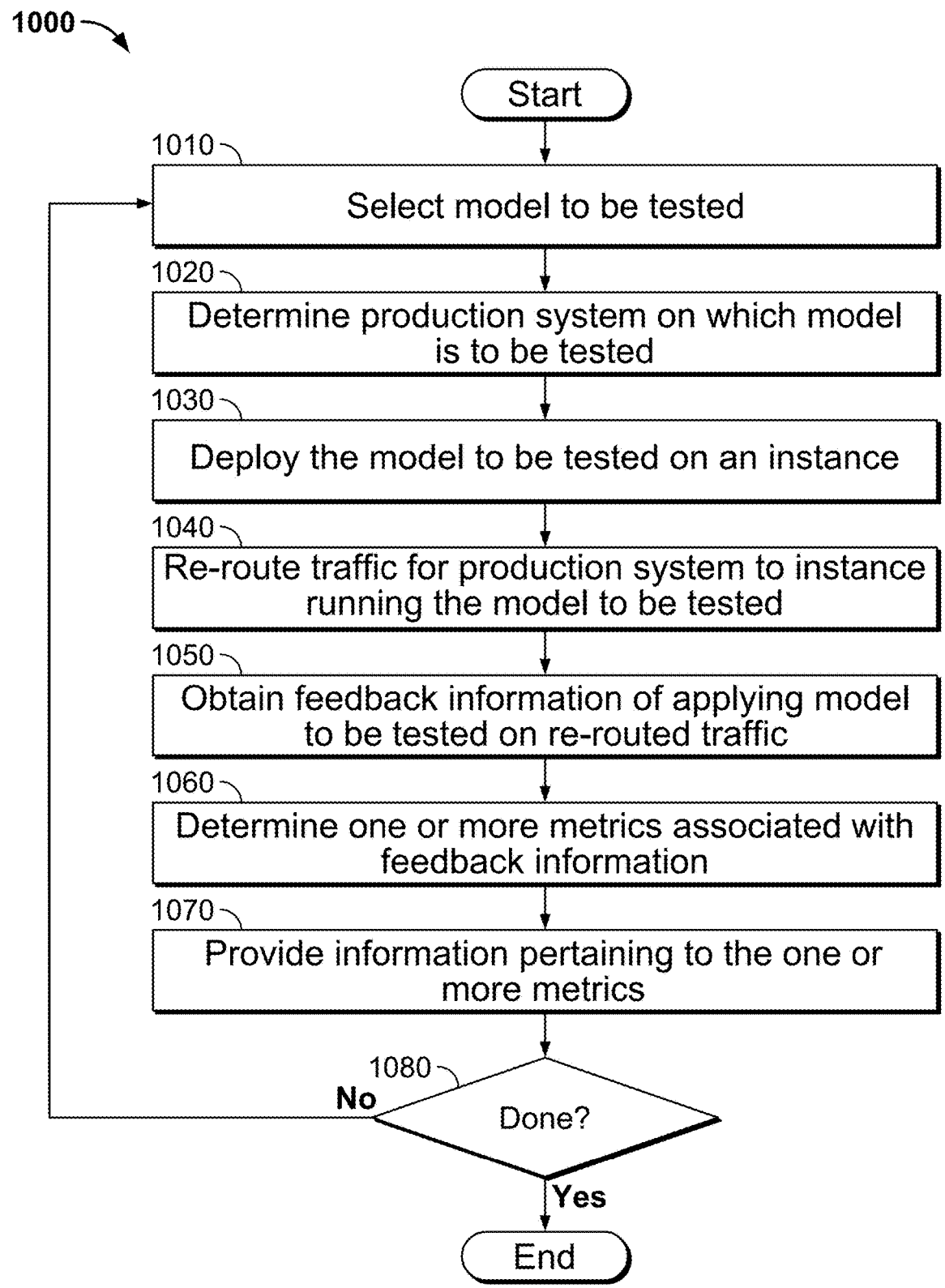
FIG. 10 is a flow diagram of a method for estimating performance of a new or updated model according to various embodiments of the present application.

FIG. 10 is a flow diagram of a method for estimating performance of a new or updated model according to various embodiments of the present application. In some embodiments, process 850 is implemented by system 100 of FIG. 1, system 200 of FIG. 2, and/or system 300 of FIG. 3A. Process 600 of FIG. 6 may be implemented in connection with process 400 of FIG. 4, process 500 of FIG. 5, process 600 of FIG. 6, process 700 of FIG. 7, and/or process 800 of FIG. 8.

According to various embodiments, process 1000 is implemented in connection with determining that a model is to be added to a shard (e.g., moving an updated model to a different shard, adding a new model to a shard, etc.). In some embodiments, process 1000 is invoked in response to a determination that a new model or updated model is uploaded/received by the system (e.g., sharding service layer 115, model store 120, etc.). As an example, process 1000 is implemented in connection with determining performance of deploying a model on a particular shard, and feedback information pertaining to a performance of the model on the particular shard is used in connection with determining whether the model is to be added to the particular shard. For example, the predetermined cost function used in connection with determining the selected shard for deployment includes a variable pertaining to the performance of the model on the particular shard.

At 1010, a model to be tested is selected. In some embodiments, the model to be tested is selected based on a determination that the model is to be deployed. For example, the selection of the model to be tested is invoked in connection with the system determining the selected shard for deployment.

At 1020, the production system on which the model is to be tested is determined. The system determines the production system on which to test the model in response to selection of the model to be tested. In some embodiments, the production system corresponds to a shard such as shard comprising a particular application. The production system on which the model is to be tested may be determined based on one or more tenants for which the model is to be deployed. For example, the one or more tenants may be associated with an application or a type of report that is to be deployed for reporting on one or more datasets associated with the one or more tenants.

At 1030, the model is deployed on an instance of the production system. In response to determining the production system on which the model is to be tested, an instance of the production system is instantiated (also referred to herein as a testing instance). In response to instantiating the instance of the production system, the system deploys the model on the testing instance. For example, the model is copied to the testing instance and the testing instance is restarted.

At 1040, traffic for the production system is re-routed to the instance running the model to be tested. In response to determining that the model is deployed, the system re-routes traffic to the production system to the testing instance. In some embodiments, only a particular percentage of the traffic to the production system is re-routed to the testing instance. In some embodiments, the percentage of traffic is configurable such as by an administrator of the system. As an example, less than 5% of incoming traffic for the production system is re-routed to the testing instance. As another example, less than 1% of incoming traffic for the production system is re-routed to the testing instance. As another example, the system is configured to slowly ramp up the percentage of traffic routed to the testing instance such as from 5% to 100% (e.g., the model to be tested and/or testing instance is slowly ramped up into the primary production model). In some embodiments, the particular percentage of traffic that is re-routed is set as part of metadata that is associated with the model to be tested (e.g., the system can obtain the particular percentage of traffic from the metadata of the model to be tested, and re-route traffic accordingly). In some embodiments, the model is tested against the real traffic that has been re-routed to the testing instance. For example, the application on the testing instance uses the model to service the re-routed traffic.

At 1050, feedback information of applying the model to be tested on re-routed traffic is obtained. In some embodiments, the feedback information includes information pertaining to results of the model servicing the traffic, performance of the model, performance of the testing instance during testing of the model, etc.

At 1060, one or more metrics associated with feedback information is determined. In response to obtaining the feedback information of applying the model to be tested on re-routed traffic, the feedback information is analyzed in connection with determining the one or more metrics of the model testing. Examples of the one or more metrics includes a time required for the model to service a query or transaction, accuracy of the results of using the model to service the queries/traffic, etc.

At 1070, information pertaining to the one or more metrics is provided. In some embodiments, the information pertaining to the one or more metrics is provided to a system (e.g., the sharding service layer 115) in connection with the system determining a shard on which to deploy a model. For example, the information pertaining to the one or more metrics is provided to the system to use in computing a value for a cost function associated with determining the selected shard for deployment.

At 1080, a determination is made as to whether process 1000 is complete. In some embodiments, process 1000 is determined to be complete in response to a determination that no further models are to be moved or allocated to a shard, a determination that development of a model has been completed, a user has indicated that no further models are to be moved, the user has exited the system, an administrator indicates that process 1000 is to be paused or stopped, etc. In response to a determination that process 1000 is complete, process 1000 ends. In response to a determination that process 1000 is not complete, process 1000 returns to 1010.

Various examples of embodiments described herein are described in connection with flow diagrams. Although the examples may include certain steps performed in a particular order, according to various embodiments, various steps may be performed in various orders and/or various steps may be combined into a single step or in parallel.

In some embodiments, the system sharding service is able to delete a tenant. For example, the sharding service receives a request to delete a tenant. The system evaluates models and/or applications that are associated with the tenant. In response to a model or an application being associated with the tenant, remove the model or the application.

In some embodiments, the system sharding service is able to delete an application. For example, the sharding service receives a request to delete an application. The system evaluates all applications to see if the request is related the each application. In response to the application being related with the requested application, remove the application.

In some embodiments, the system sharding service is able to delete a model. For example, the sharding service receives a request to delete a model. The system evaluates all models to see if the request is related to each model. In response to the model or an application being related with the requested model, remove the model.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
one or more processors configured to:

determine that a first model is to be added to a first shard of a plurality of shards, the first shard being determined based at least in part on a predetermined cost function;

add the first model to the first shard, wherein:
the first model is associated with a first tenant; and
the first shard comprises at least one second model that is associated with a second tenant; and restart the first shard; and a memory coupled to the one or more processors and configured to provide the one or more processors with instructions.

2. The system of claim 1, wherein a first set of models of a first shard do not overlap a second set of models of a second shard.

3. The system of claim 1, wherein a plurality of instances run on a shard of the plurality of shards, and at least one of the plurality of instances have a plurality of models.

4. The system of claim 3, wherein each of the plurality instances are identical with respect to an application running on each of the plurality of instances and configurations of each of the plurality of instances.

5. The system of claim 4, wherein a first set of models within an identical instance of the first shard share overhead resources.

6. The system of claim 1, wherein adding the first model to the first shard comprises allocating the first model from a second shard.

7. The system of claim 1, wherein the one or more processors is further configured to:
determine whether adding the first model to the first shard is complete; and
in response to determining that adding the first model to the first shard is complete, deleting the first model from a second shard on which the first model was running.

8. The system of claim 1, wherein the one or more processors are further configured to:
receive an indication to delete an application;
determine a set of shards on which the application is running;
delete the set of shards on which the application is running.

9. The system of claim 1, wherein:
the one or more processors are further configured to:
determine whether a shard comprises non-updated models; and
in response to a determination that the shard comprises non-updated models, deleting the shard.

10. The system of claim 1, wherein the predefined cost function is based at least in part on available memory in the first shard.

11. The system of claim 1, wherein the predefined cost function is based at least in part on one or more of (i) a value pertaining to an amount of traffic to the first model of a corresponding predefined period of time; (ii) a size of the first tenant corresponding to the first model; (iii) a number of users associated with the first tenant; and/or (iv) an average number of transactions associated with a tenant over a corresponding predefined period of time.

12. The system of claim 1, wherein the first shard comprises at least N models.

13. The system of claim 1, wherein determining that the first model is to be added to the first shard is performed in connection with a batch process according to which a plurality of models are reallocated among the plurality of shards.

14. The system of claim 1, wherein:
the first model corresponds to an updated version of a model on another shard; and
the one or more processors are further configured to:
re-route traffic to the first model on the first shard from the model on the other shard after adding the first model to the first shard is complete.

15. The system of claim 1, wherein the one or more processors are further configured to:
select the first shard to which the first model is to be added, wherein selecting the first shard is based at least in part on a determination that the first model is expected to fit in the first shard.

16. The system of claim 1, wherein the one or more processors are further configured to:
receive an indication to update a model;
determine whether an updated model is expected to fit in a shard in which the model currently exists; and
in response to a determination that the updated model is expected to fit in the shard in which the model currently exists, update the model to be updated within the shard in which the model currently exists.

17. A method, comprising:
determining that a first model is to be added to a first shard of a plurality of shards, the first shard being determined based at least in part on a predetermined cost function;
adding the first model to the first shard, wherein:
the first model is associated with a first tenant; and
the first shard comprises at least one second model that is associated with a second tenant; and
restarting the first shard.

18. A computer program product embodied in a non-transitory computer readable medium and comprising computer instructions for:
determining that a first model is to be added to a first shard of a plurality of shards, the first shard being determined based at least in part on a predetermined cost function;
adding the first model to the first shard, wherein:
the first model is associated with a first tenant; and
the first shard comprises at least one second model that is associated with a second tenant; and
restarting the first shard.

* * * * *